United States Patent [19]

Hayasaki et al.

[11] Patent Number: 6,094,280
[45] Date of Patent: Jul. 25, 2000

[54] METHOD AND APPARATUS FOR CORRECTING PRINT DENSITY BY PRINTHEAD, PRINTHEAD CORRECTED BY THIS APPARATUS, AND PRINTING APPARATUS USING THIS PRINTHEAD

[75] Inventors: Kimiyuki Hayasaki, Yokohama; Masaki Inaba, Kawasaki; Hisashi Fukai, Yokohama, all of Japan

[73] Assignee: Canon Kabushiki Kaisha, Tokyo, Japan

[21] Appl. No.: 08/966,463

[22] Filed: Nov. 7, 1997

[30] Foreign Application Priority Data

Nov. 8, 1996 [JP] Japan .................................. 8-296499

[51] Int. Cl.[7] .............................. B41B 15/00; B41J 15/00; G06F 15/00
[52] U.S. Cl. ............................... 358/1.9; 347/188
[58] Field of Search .................... 395/108, 109; 347/184, 188, 191; 358/1.8, 1.9

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,683,481 | 7/1987 | Johnson .................................. 347/65 |
| 4,723,129 | 2/1988 | Endo et al. . |
| 4,740,796 | 4/1988 | Endo et al. . |
| 4,801,948 | 1/1989 | Kato ........................................ 347/184 |
| 5,016,023 | 5/1991 | Chan et al. . |
| 5,319,391 | 6/1994 | Takahashi et al. ........................ 347/76 |
| 5,736,996 | 4/1998 | Takada et al. ............................. 347/19 |
| 5,795,081 | 8/1998 | Miyaji ................................. 400/120.07 |
| 5,796,420 | 8/1998 | Kaerts et al. ............................ 347/188 |
| 5,825,394 | 10/1998 | Gilbert et al. ........................... 347/191 |
| 5,825,399 | 10/1998 | Orlicki et al. ........................... 347/237 |

FOREIGN PATENT DOCUMENTS

| | | |
|---|---|---|
| 55-132253 | 10/1980 | Japan . |
| 59-123670 | 7/1984 | Japan . |
| 59-138461 | 8/1984 | Japan . |
| 6-34558 | 2/1994 | Japan . |

Primary Examiner—Amelia Au
Assistant Examiner—F. E. Cooperrider
Attorney, Agent, or Firm—Fitzpatrick, Cella, Harper & Scinto

[57] ABSTRACT

A high-yield printhead where density unevenness is surely corrected taking into consideration various factors related to manufacturing processes of the printhead, a printer utilizing the printhead, and an apparatus and method for correcting print density unevenness by the printhead, are provided. According to the method, a plurality of correction tables generated based on the data reflecting the various factors related to manufacturing processes of the printhead are prepared in advance. A test print pattern is printed by using a full-line printhead having a memory for storing correction data, and a tendency of density distribution of the printed pattern image is analyzed. On the basis of the tendency of the density distribution obtained as a result of the analysis, the most appropriate correction table is selected from the plurality of stored correction tables. Then, correction data which is used for suppressing density unevenness is generated on the basis of the selected most appropriate correction table, and the generated correction data is transmitted to the memory of the printhead.

18 Claims, 23 Drawing Sheets

FIG. 7

| PRINTING ELEMENT UNIT No.<br>TIME<br>PERIOD APPLYING<br>ELECTRIC CURRENT FOR PRINTING | 1 | 2 | ...... | M |
|---|---|---|---|---|
| ① TIME PERIOD CALCULATED BASED ON RESISTIVITY OF PRINTING ELEMENT UNIT | 3.75μs | 3.625μs | ...... | 3.625μs |
| ② PREHEATING PULSE WIDTH OF STANDARD PATTERN<br>MEAN VALUE OF ① × α ( α = 0.27 ) | 0.875μs | | | |
| ③ DRIVING PULSE WIDTH APPLIED TO PRINTING ELEMENT UNIT (WAVEFORM OF PULSE WHEN PRINTING BY STANDARD PATTERN) | PRE-PULSE 0.875μs  MAIN PULSE 2.875μs | PRE-PULSE 0.875μs  MAIN PULSE 2.75μs | ...... | PRE-PULSE 0.875μs  MAIN PULSE 2.75μs |

FIG. 8

| CORRECTION PARAMETER / PRINTING ELEMENT No. | 1 | 2 | 3 | ... | M×N−1 | M×N |
|---|---|---|---|---|---|---|
| ① PREHEATING 0.875μs | 0.41 | 0.35 | *0.44 | ------- | | 0.38 |
| ② PREHEATING 1.000μs | *0.44 | 0.37 | 0.47 | ------- | *0.43 | 0.40 |
| ③ PREHEATING 1.125μs | 0.46 | 0.39 | 0.49 | ------- | 0.45 | *0.42 |
| ④ PREHEATING 1.25μs | 0.48 | *0.43 | 0.51 | ------- | 0.47 | 0.45 |
| ... | ------- | ------- | ------- | ------- | ------- | ------- |
| ⑩ PREHEATING 2.0μs | 0.62 | 0.51 | 0.67 | ------- | 0.60 | 0.60 |
| CORRECTION PARAMETER TO BE SET | ② | ④ | ① | | ② | ③ |

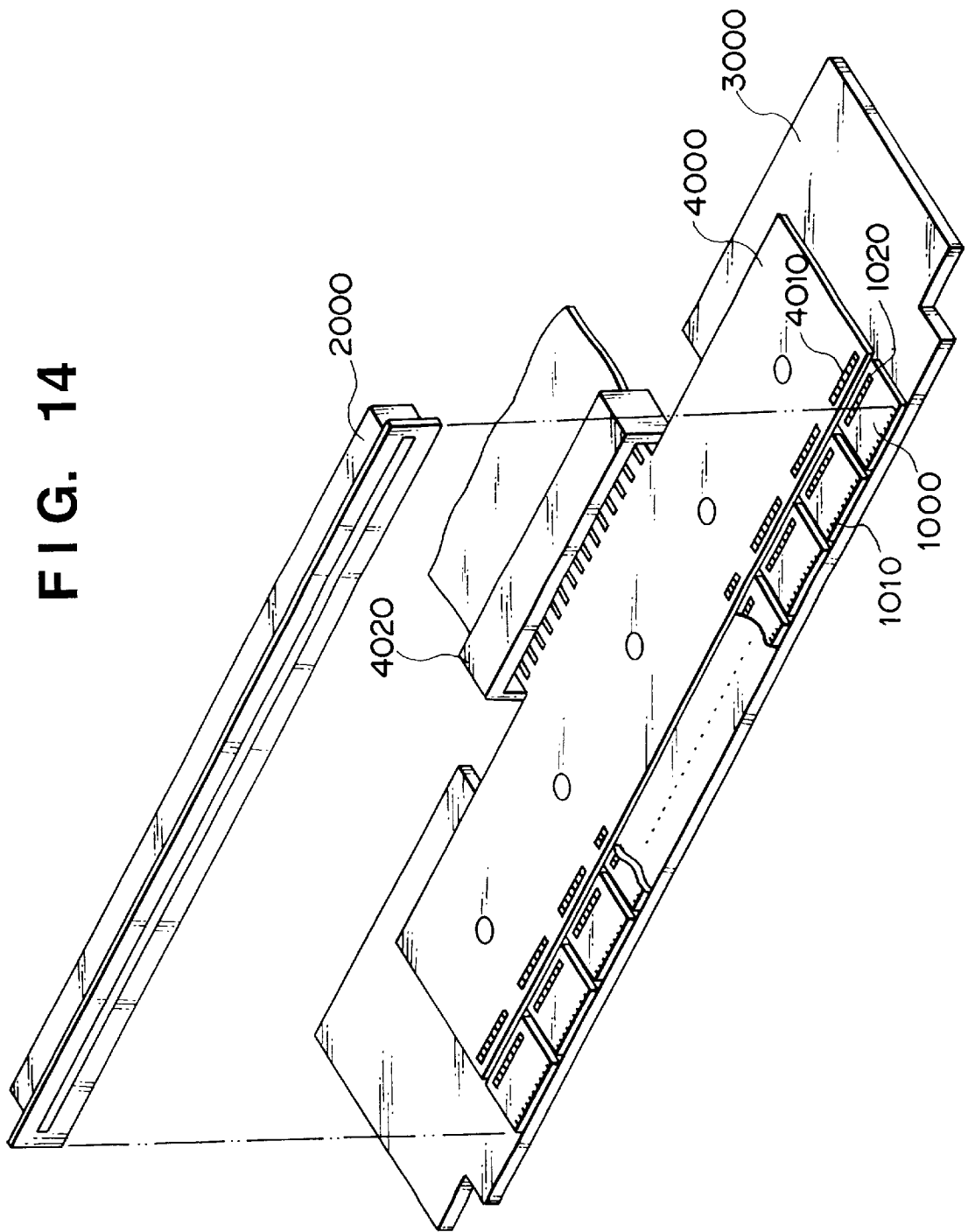

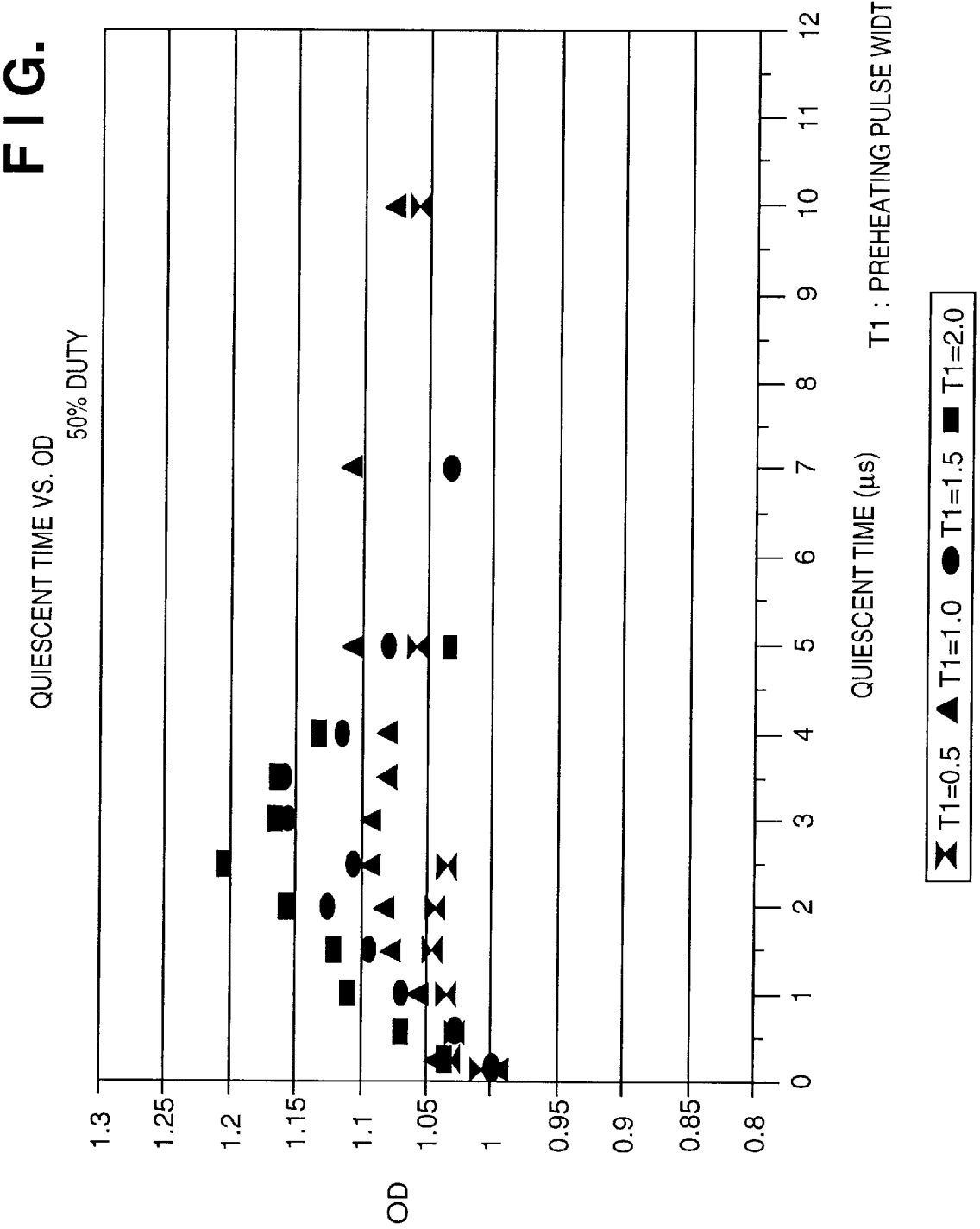

METHOD AND APPARATUS FOR CORRECTING PRINT DENSITY BY PRINTHEAD, PRINTHEAD CORRECTED BY THIS APPARATUS, AND PRINTING APPARATUS USING THIS PRINTHEAD

BACKGROUND OF THE INVENTION

The present invention relates to a method and apparatus for correcting print density by a printhead, a printhead corrected by this apparatus and a printing apparatus using this printhead.

A printer or the printing section of a copying machine or facsimile machine is so adapted as to print an image, which comprises a dot pattern, on a recording medium such as a paper, a thin plastic sheet or fabric based upon image information.

Among these printing apparatuses, those which are the focus of attention because of their low cost are mounted with printheads that rely upon the ink-jet method, the thermosensitive-transfer method or the LED method, etc., in which a plurality of printing elements corresponding to dots are arrayed on a base.

In a printhead in which these printing elements are arrayed to correspond to a certain printing width, the printing elements can be formed through a process similar to a semiconductor manufacturing process. Accordingly, a transition is now being made from a configuration in which the printhead and driving integrated circuitry are arranged separately of each other to an integrated assembled configuration in which the driving integrated circuitry is structurally integrated within the same base on which the printing elements are arrayed.

As a result, complicated circuitry involved in driving the printhead can be avoided and the printing apparatus can be reduced in size and cost.

Among these types of printing methods, the ink-jet printing method, in which thermal energy is made to act upon ink and the ink is discharged by utilizing the pressure produced by foaming, is particularly advantageous in that the response to a printing signal is good and it is easy to group the orifices close together at a high density. There are greater expectations for this method in comparison with the other methods.

When the printhead is manufactured by applying a semiconductor manufacturing process and, in particular, when numerous printing elements that are to be made to correspond to the printing width are arrayed over the entire area of a base, it is very difficult to manufacture all of the printing elements without any defects. As a consequence, the manufacturing yield of the process for manufacturing the printhead is poor and this is accompanied by higher cost. There are occasions where such a printhead cannot be put into practical use because of the costs involved.

Accordingly, methods of obtaining a full-line printhead have been disclosed in the specifications of Japanese Patent Application Laid-Open (KOKAI) Nos. 55-10 132253, 2-2009, 4-229278, 4-232749 and 5-24192 and in the specification of U.S. Pat. No. 5,016,023. According to these methods, a number of high-yield printhead units each having an array of a comparatively small number, e.g., 32, 48, 64 or 128, of printing elements and orifices corresponding to these printing elements are placed upon (or upon/below) a single supporting base at a high precision in conformity with the density of the array of printing elements, thereby providing a full-line printhead whose length corresponds to the necessary printing width.

It has recently become possible on the basis of this technique to simply manufacture a full-line printhead by arraying a comparatively small number (e.g., 64 or 128) of printing elements on element-bases (also referred to as "printing units") and bonding these printing units in a row on a supporting base plate in a highly precise fashion over a length corresponding to the necessary printing width.

Though it has thus become easy to manufactured a full-line printhead, certain performance-related problems remain with regard to a printhead manufactured by the foregoing manufacturing method. For example, a decline in printing quality, such as density unevenness, cannot be avoided. The cause is a variation in performance from one printing unit (element-base) to another in the row of such printing units, a variation in the performance of neighboring printing elements between the arrayed printing units and heat retained in each driving block at the time of printing.

In particular, in the case of an ink-jet printhead, not only a variation in the neighboring printing elements between the arrayed printing units but also a decline in ink fluidity owing to the gaps between printing units results in lower yield in the final stage of the printhead manufacturing process. For this reason, the state of the art is such that these printheads are not readily available on the market in large quantities regardless of the fact that these printheads exhibit highly satisfactory capabilities.

As disclosed in Japanese Patent Application No. 6-34558 (U.S. patent application Ser. No. 08/397,352), there is a method of correcting the unevenness in the density of printhead by measuring dot diameter and correcting unevenness based upon the results of measurement, as means of correcting density unevenness in the printhead. However, there is still the following problems to be solved in view of reproducibility of printed dots. For example, when one line of printing has been performed, the characteristics of the printed dots change subtly on the next line, over the next several dozen lines and over the next several hundred lines. (This is known as "fluctuation" from dot to dot.) Since a specific phenomenon (dot diameter) which incorporates this fluctuation is employed as information regarding density unevenness, satisfactory results are not obtained with a single correction. In order to acquire the desired image quality, it is required that printed dot data from several measurements be acquired to perform the correction. In a case where electrical energy is converted to thermal energy in conformity with correction data, energy which is larger than usual is applied to the printing elements that exhibit a low density. Thus, it is highly desirable to further improve reliability in terms of the durability of the printhead.

Furthermore, there is another conventional method such as a prediction method using an OD value, or predicting density unevenness from the fluctuation of dot diameter data acquired in printhead manufacturing process and employing it as correction data. However, a good correlation between printhead performance and the correction data does not always exist according to these methods. Thus, accurate density correction is not always ensured.

Still further, there are cases where accurate density unevenness correction cannot be ensured because various factors involved in the manufacturing process affect characteristics of the printhead, and/or because a given corresponding correction signal does not result in an appropriate correction amount due to density unevenness interfering with printed pixels by neighboring printing elements.

SUMMARY OF THE INVENTION

The present invention has been made in consideration of the above situation, and has as its object to provide a high-yield printhead which ensuredly corrects density unevenness, taking into consideration various factors involved in the manufacturing process the printhead, and a printer utilizing the printhead.

It is another object of the present invention to provide an apparatus and method for correcting the aforementioned printhead.

According to one aspect of the present invention, the foregoing object is attained by providing a printhead correction apparatus for correcting a printed density by a printhead having a plurality of printing elements and memory means capable of storing data, comprising: storage means for storing a plurality of correction tables each corresponding to a tendency of density variance, in a printed image, caused by a structure of the printhead; selecting means for selecting the most appropriate correction table from the plurality of correction tables, in accordance with a tendency of density variance in an image printed by the printhead subjected to correction; and outputting means for outputting correction data based on the correction table selected by the selecting means, to the memory means of the printhead subjected to correction.

It is preferable that the above apparatus further includes: print control means for test-printing a print pattern on a recording medium by using the printhead subjected to correction; and analyzing means for analyzing a tendency of density variance in an image of the print pattern printed on the recording medium, wherein the selecting means selects the most appropriate correction table on the basis of the analysis result of the analyzing means.

Furthermore, it is preferable that the above apparatus further generates correction data, by performing calculation on the basis of the selected correction table, used for suppressing density unevenness caused by printing an image by the printhead subjected to correction, wherein the outputting means outputs the generated correction data.

Herein, the plurality of correction tables include data reflecting various factors related to a manufacturing process of the printhead. For instance, in a case where the printhead includes N×M number of printing elements and the printhead is configured by connecting M number of circuit boards each having N number of printing elements such that the circuit boards are arrayed in a line, the various factors include: deviations at a connected portion of the circuit boards, a bend generated by the M number of entire circuit boards being connected, and a bend generated by each of the M number of circuit boards.

Alternatively, with respect to print density of each of a plurality of printing elements, difference in print density between each of the neighboring printing elements is calculated, and with respect to a printing element having a large print density difference, correction data is generated on the basis of the calculated print density difference between each printing element.

According to another aspect of the present invention, the foregoing object is attained by providing a printhead correction method of correcting a printed density by a printhead having a plurality of printing elements and a memory medium capable of storing data, comprising: a storing step of storing a plurality of correction tables each corresponding to a tendency of density variance, in a printed image, caused by a structure of the printhead; a selecting step of selecting the most appropriate correction table from the plurality of correction tables, in accordance with a tendency of density variance in an image printed by the printhead subjected to correction; and an outputting step of outputting correction data based on the correction table selected in the selecting step, to the memory medium of the printhead subjected to correction.

According to still another aspect of the present invention, the foregoing object is attained by providing a printhead which is corrected by the printhead correction apparatus having the aforementioned configuration.

The printhead corrected as above preferably includes EEPROM as the memory means. By arraying, in a line, M number of circuit boards each having N number of printing elements, a printhead having N×M number of printing elements can be configured. The printhead is preferably an ink-jet printhead for performing printing by discharging an ink. Moreover, the printhead is preferably a printhead for discharging an ink by utilizing heat energy, and includes heat energy transducers for generating heat energy to be applied to the ink.

According to still another aspect of the present invention, the foregoing object is attained by providing a printer which employs the printhead corrected as described above, comprising receiving means for receiving the correction data from the printhead; controlling means for generating a control signal to control operation of driving means such that each of the plurality of printing elements forms a uniform pixel; and transmitting means for transmitting the control signal to the printhead.

In accordance with the printhead correction apparatus of the present invention as described above, a printhead, having a plurality of printing elements and a memory medium capable of storing data, is corrected by storing a plurality of correction tables each corresponding to a tendency of density variance, in a printed image, caused by a structure of the printhead; selecting the most appropriate correction table from the plurality of correction tables, in accordance with a tendency of density variance in an image printed by the printhead subjected to correction; and outputting correction data based on the selected correction table, to the memory means of the printhead subjected to correction.

On the other hand, the printer, which employs the printhead corrected as described above, receives the correction data stored in the memory means of the printhead; generates a control signal to control operation of driving means included in the printhead such that each of the plurality of printing elements of the printhead forms a uniform pixel; and transmits the control signal to the printhead.

The invention is particularly advantageous since density unevenness, which shows a specific tendency of density distribution due to various factors in a manufacturing process of the printhead, can be corrected.

Accordingly, it is possible to provide a printhead which can print a high quality image with no density unevenness.

Furthermore, in the printer which employs the printhead corrected as described above, the correction data stored in the memory means of the printhead is received; a control signal is generated for controlling operation of driving means included in the printhead such that each of the plurality of printing elements of the printhead forms a uniform pixel; and the control signal is transmitted to the printhead. Accordingly, it is possible to perform high quality printing where density of each printed pixel is uniform.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 7 is a diagram showing double pulse widths on each printing unit to print a reference pattern;

FIG. 8 is a diagram showing an OD value on each printing element obtained from various printed test patterns in accordance with variation of a preheating pulse width;

FIG. 14 is an exploded perspective view for describing the construction of a printhead according to the present invention;

FIG. 23 is a diagram showing the relationship between an OD value and interval time.

DETAILED DESCRIPTION OF THE PREFERRED EMBODIMENT

Preferred embodiment of the present invention will be described in detail in accordance with the accompanying drawings.

<Brief Description of Main Unit of the Apparatus>

Figure 1:
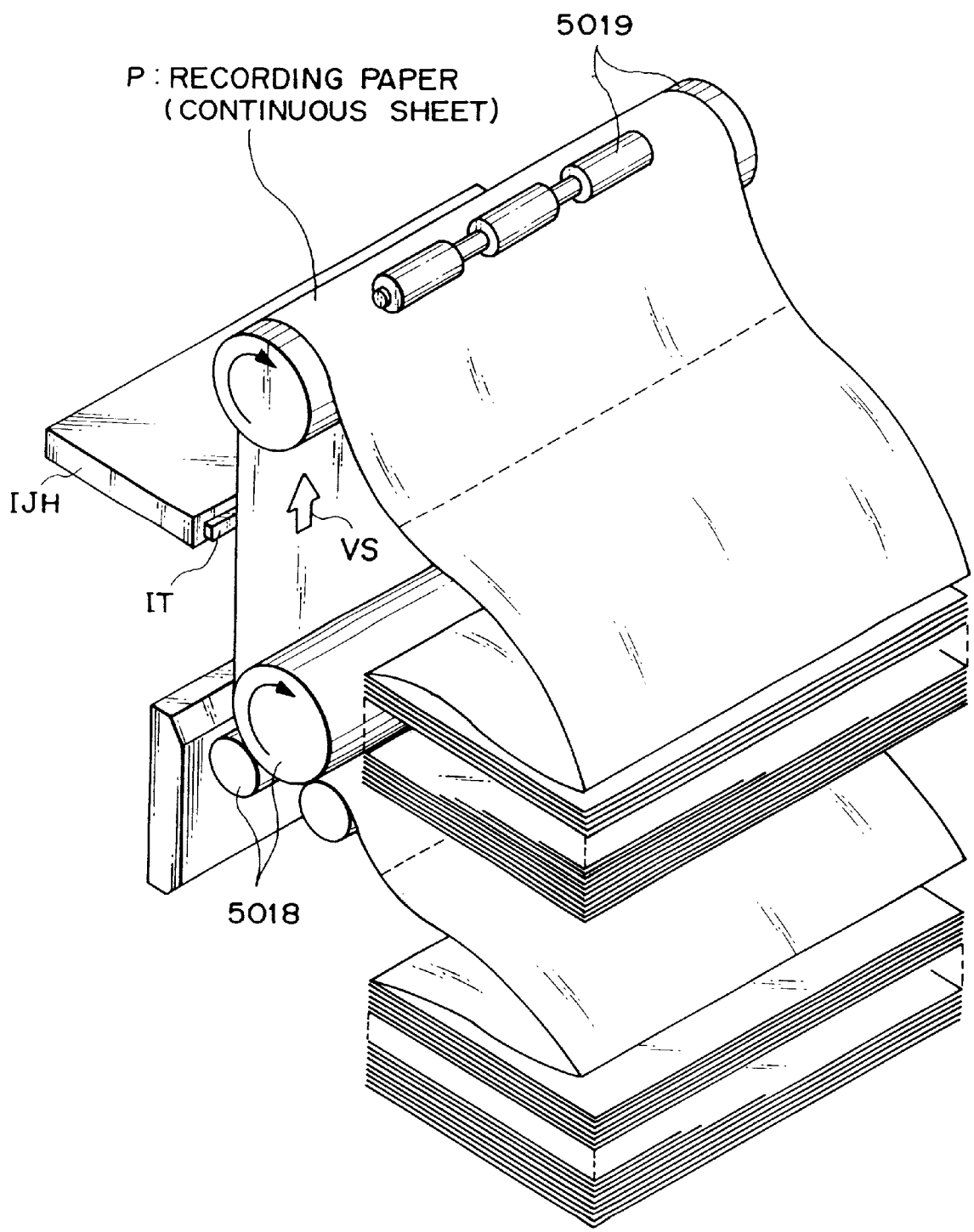
FIG. 1 is a general view of a full-line ink-jet printer, which is a typical embodiment of the present invention.

FIG. 1 is an external perspective view showing the principal portions of an ink-jet printer IJRA, which is a typical embodiment of the present invention. As shown in FIG. 1, the printer has a printhead (a full-length multiple printhead) IJH arranged along a range of full width of recording paper (a continuous sheet) P. The printhead IJH discharges ink over a range extending across the full width of the recording paper P. The ink is discharged toward the recording paper P from an orifice IT of the printhead at a prescribed timing.

In this embodiment, the continuous sheet of foldable recording paper P is conveyed in the direction VS in FIG. 1 by driving a conveying motor under the control of a control circuit, described below. An image is printed on the recording paper. The printer in FIG. 1 further includes sheet feeding rollers 5018 and discharge rollers 5019. The discharge rollers 5019 cooperate with the sheet feeding rollers 5018 to hold the continuous sheet of recording paper P at the printing position and operate in association with the sheet feeding rollers 5018, which are driven by a drive motor (not shown), to feed the recording paper P in the direction of arrow VS.

Figure 2:
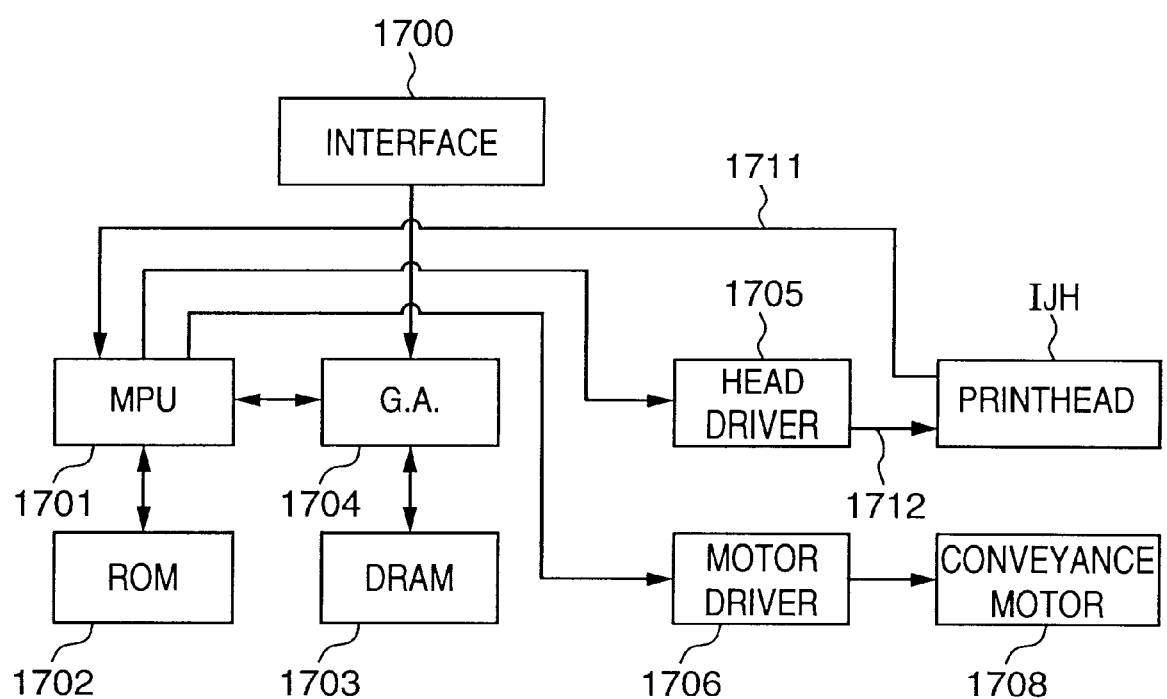
FIG. 2 is a block diagram showing a control configuration for executing control of printing in the ink-jet printer.

FIG. 2 is a block diagram illustrating the construction of the control circuit of the ink-jet printer. Shown in FIG. 2 are an interface 1700 for entering a printing signal from an external device such as a host computer, an MPU 1701; a ROM 1702 for storing a control program (inclusive of character fonts as necessary) executed by the MPU 1701, a DRAM 1703 for temporarily saving various data (the above-mentioned printing signal and printing data that are supplied to the printhead), and a gate array (G.A.) 1704 for controlling supply of printing data to the printhead IJH. The gate array 1704 also controls transfer of data among the interface 1700, MPU 1701 and RAM 1703. Also shown are a conveyance motor 1708 for conveying recording paper (the continuous sheet in this embodiment), a head driver 1705 for driving the printhead, and a motor driver 1706 for driving the conveyance motor 1708.

As for the general operation of the above-mentioned control circuit, the printing signal enters the interface 1700, whereupon the printing signal is converted to printing data for printing between the gate array 1704 and MPU 1701. The motor driver 1706 is driven into operation and the printhead IJH is driven in accordance with the printing data sent to the head driver 1705. As a result, a printing operation is carried out.

Figure 18:
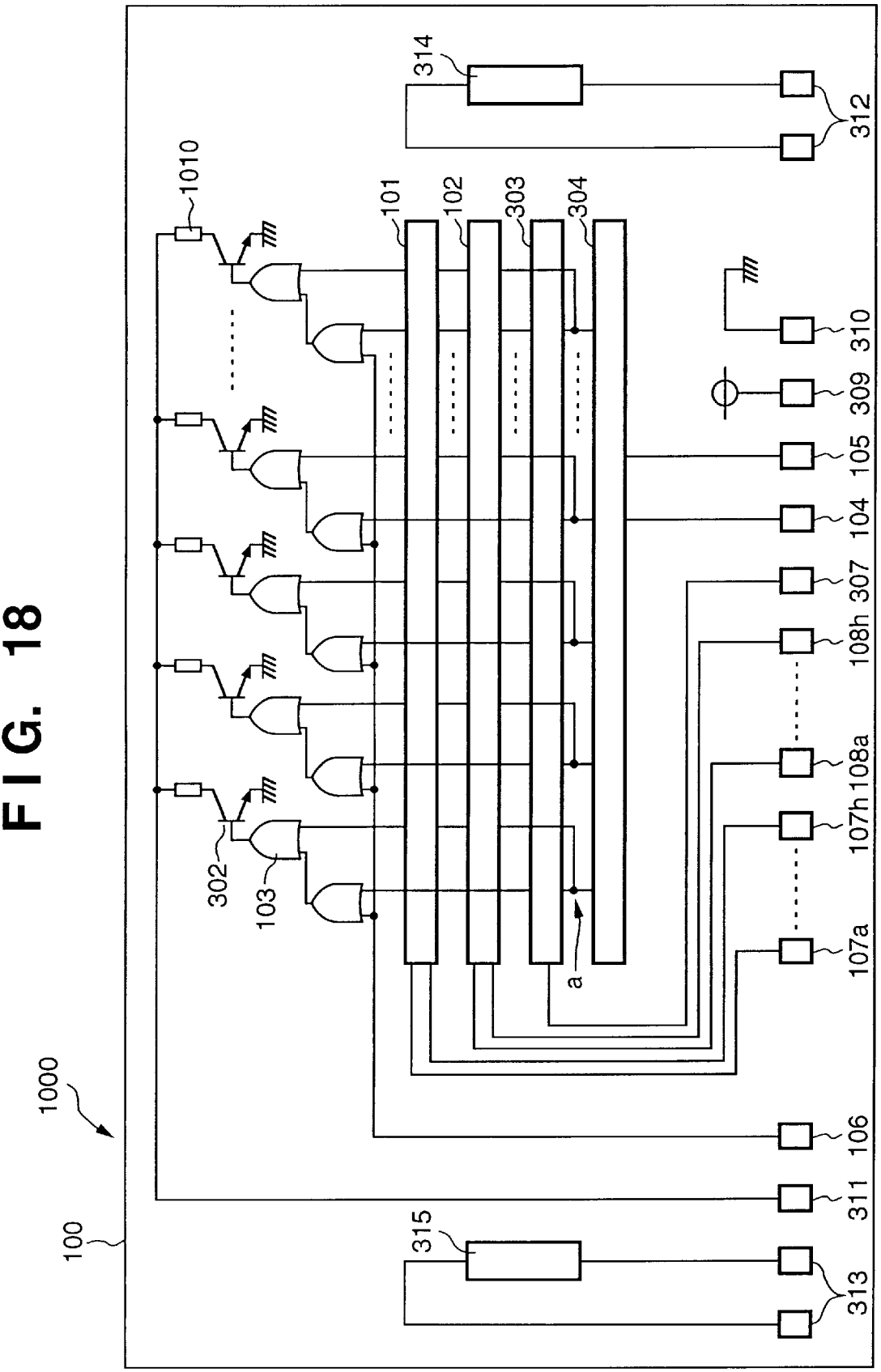
FIG. 18 is a diagram showing an example of the circuit arrangement of a drive circuit provided on the heater board for the printhead.

Numeral 1711 denotes a signal line for monitoring sensors (e.g., a heating-resistor sensor 314 and a temperature sensor 315, which are shown in FIG. 18) of each element-board, and for transmitting correction data from a memory 13 (described later) storing correction data which corrects for a variation in each board (described as a heater board 1000 later) provided within the printhead IJH. Numeral 1712 denotes a signal line for carrying preheating pulses, latch signals and heating pulses. On the basis of the correction data from the memory 13 in the printhead IJH, the MPU 1701 sends the printhead IJH a control signal via the signal line go 1712 in such a manner that the boards are capable of forming uniform pixels.

Figure 3:
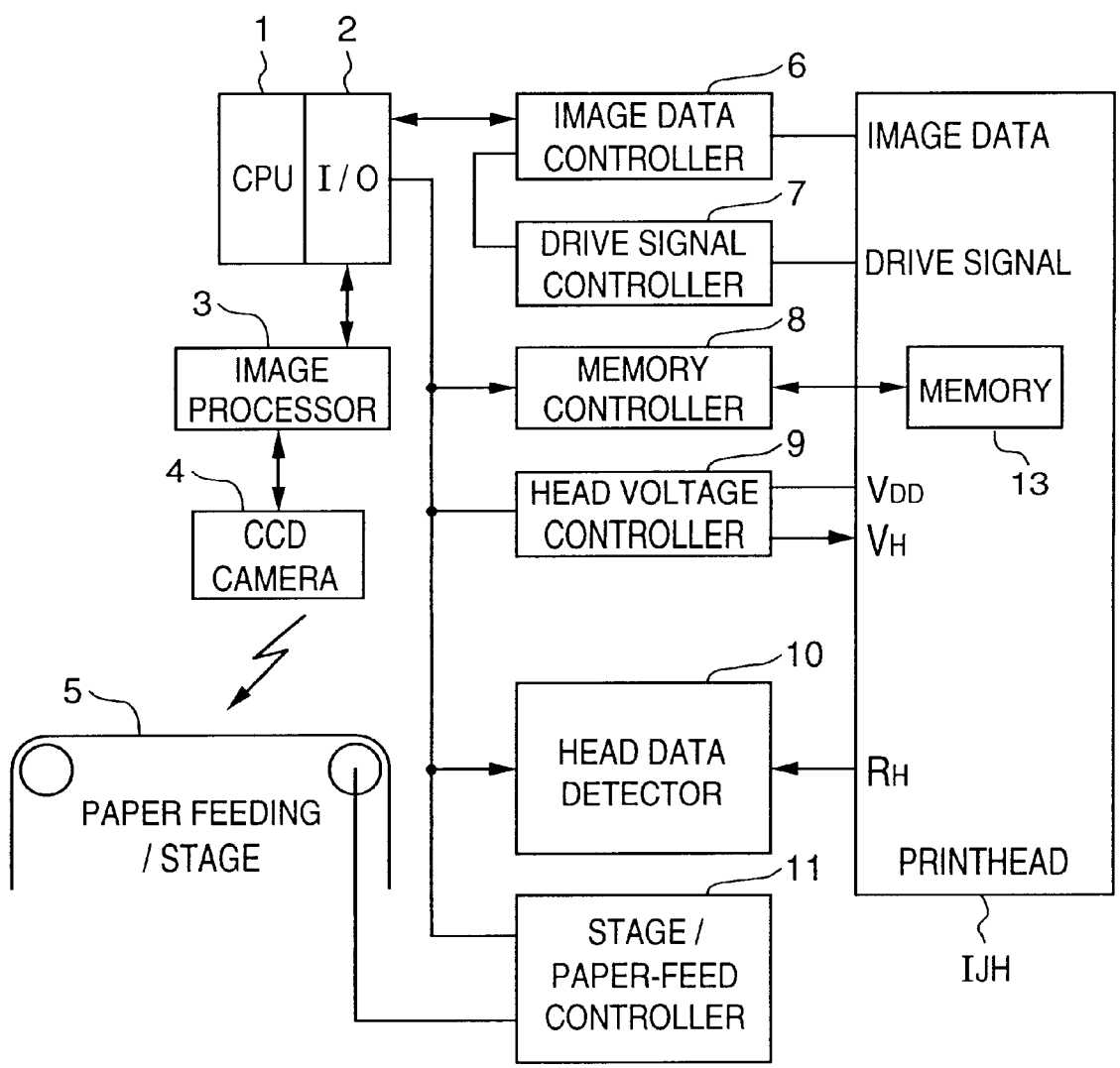
FIG. 3 is a block diagram showing the construction of a printhead correction apparatus according to this embodiment.

FIG. 3 is a block diagram illustrating the construction of the printhead correction apparatus of this embodiment. An I/O interface 2 interfaces the CPU 1 with the various controllers of the apparatus. An image processor 3 uses a CCD camera 4 to read the printing dot pattern on a recording medium placed upon a paper-feeding/stage 5 and converts the dot diameter and density unevenness of the dot pattern to pixel values. When the dot data corresponding to all printing elements (heating resistors) of the printhead IJH is sent from the image processor 3 to the CPU 1, the latter operates upon the dot data, sends density correction data to a drive signal controller 7 in conformity with a drive signal for driving the printhead IJH and causes a memory controller 8 to develop the density correction data.

Furthermore, CPU 1 incorporates a memory which stores analysis programs for analyzing density distribution of a test pattern, a plurality of correction tables (described in detail later) to be selected in accordance with the result of analysis and generation programs for generating density correction data on the basis of the selected correction table.

An image data controller 6 outputs a dot pattern to be recorded to the printhead IJH. The controller 6 transmits a density correction drive signal while sending a synchronizing signal to the drive signal controller 7 not only at the time of ordinary printing but also when the density correction data has been determined. The CPU 1 manages a head voltage controller 9 which controls the driving voltage of the printhead IJH and manages a stage/paper-feed controller 11 for controlling the operation of the paper-feeding/stage 5, thereby setting a proper drive voltage and controlling stage movement and paper feed. Furthermore, a head data detector 10 is an important component which feeds back, for the purpose of density correction, the characteristics of each board (printing unit) 1000 (see FIG. 14) within the printhead IJH.

In the printhead IJH which, for example, is composed of a row of a plurality of element-boards 1000 on which 64 or 128 printing elements have been disposed, it is not known from which portions of a silicon wafer or the like the element-boards 1000 have been cut. Accordingly, there are cases in which the characteristics differ from one element-board to another.

In such case, a rank detecting resistor element $R_H$ having a surface resistivity ($\Omega/\square$) identical with that of the printing element is provided in each element-board 1000 in order that all printheads can perform printing at uniform density. There are also cases in which a semiconductor element capable of monitoring a change in temperature is provided for each element-board 1000. The head data detector 10 monitors these elements. When the head data detector 10 sends data obtained by monitoring these elements to the CPU 1, the latter generates correction data, which is for correcting the data that drives each of the element-boards 1000, in such a manner that each element-board 1000 in the printhead can print at a uniform density. The rank mentioned here is a parameter obtained by quantifying the characteristics of each element-board 1000. The parameter is expressed by a function of a surface resistivity ($\Omega/\square$)

When the above-mentioned correction data is reflected in each controller of the apparatus for correcting a print density by the printhead, the printing operation by the printhead IJH is executed under these conditions. In the apparatus for correcting a print density by the printhead, the results of printing are again subjected to image processing by the CCD camera 4 and image processor 3, and the memory controller 8 writes the final correction data in the memory 13 (a non-volatile memory such as an EEPROM) at a stage at which the predetermined criteria of the printhead is satisfied.

Figure 4:
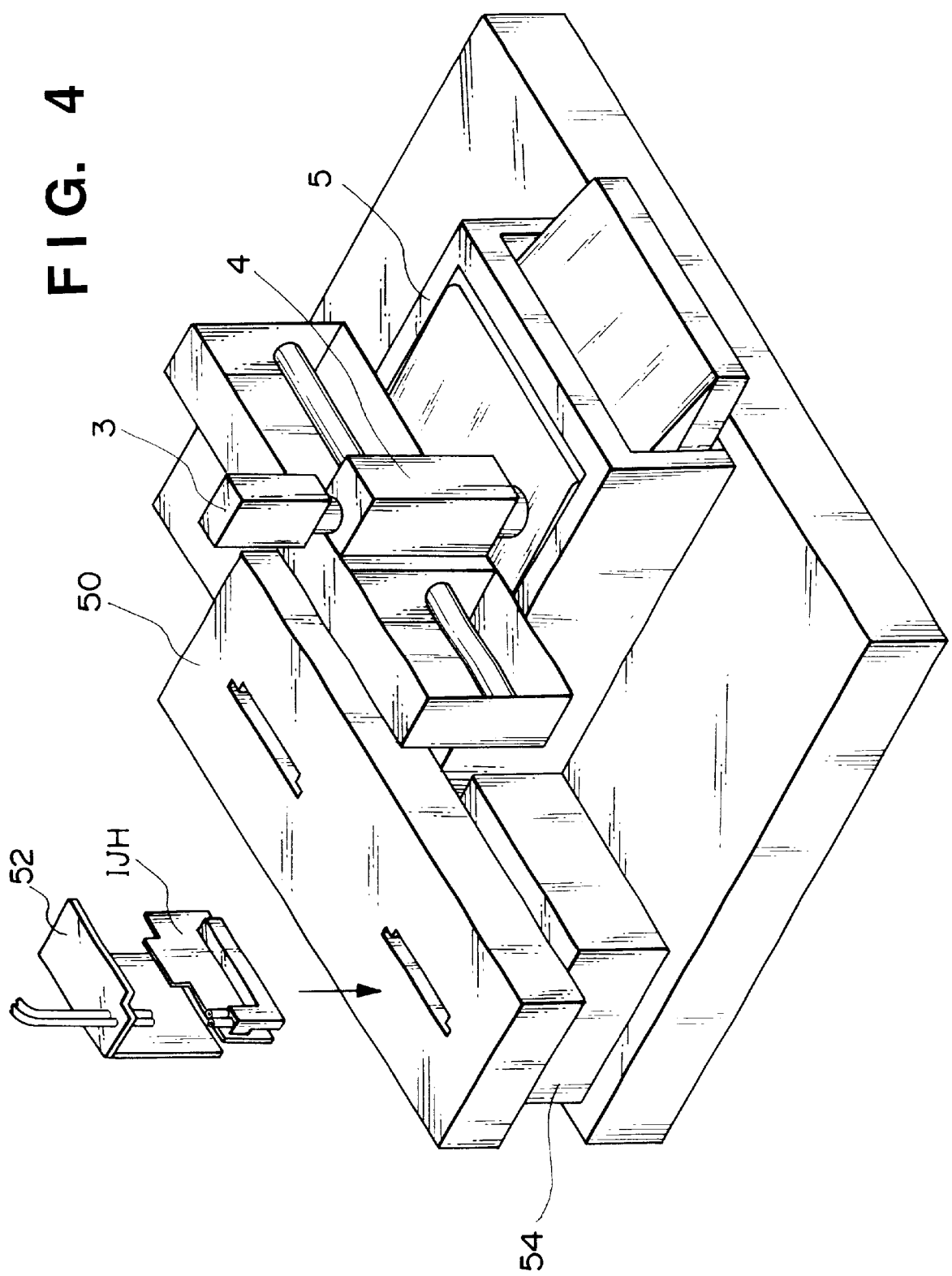
FIG. 4 is a perspective view showing the construction of the printhead correction apparatus.
Figure 5:
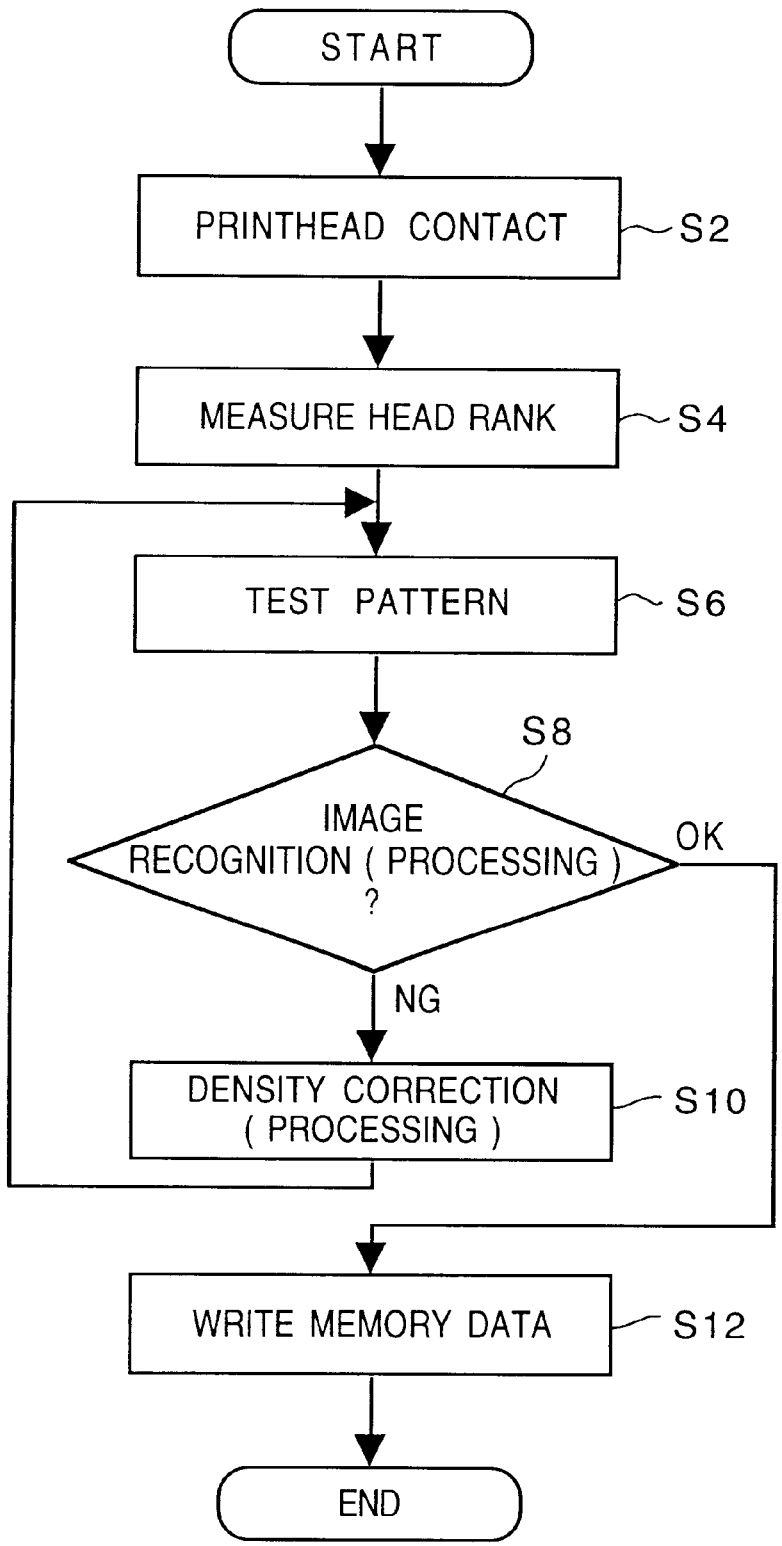
FIG. 5 is a flowchart showing the operation of the printhead correction apparatus.

FIG. 4 is an external perspective view showing the construction of the printhead correction apparatus, and FIG. 5 is a flowchart illustrating the operation of the apparatus. Operation will now be described with reference to FIGS. 4 and 5. In this embodiment, the following two correction processings will be described: (1) a case where correction is made in units of four dots by generating density unevenness data every four dots; and (2) a case where correction is made in unit of one dot by generating density unevenness data every dot.

(1) Correction Processing in Units of Four Dots

When the printhead IJH is inserted into a slot of a securing table 50, the CPU 1 operates the table 50 and fixes the printhead IJH to the table 50 in such a manner that the printhead IJH can perform printing at a normal position. At the same time, electrical contact is made with the printhead IJH, and an ink supply device 52 is connected to the printhead IJH (step S2). Next, in order to measure the rank of the printhead IJH, the surface resistivity ($\Omega/\square$) of the element-board 1000 is monitored (step S4).

In the case of a full-line printhead unit, the surface resistivity ($\Omega/\square$) of each block (of each element-board in a case where the block is constituted by an array of a plurality of element-boards) is monitored, driving power is decided separately for each board and a test pattern is printed (step S6). As preprocessing for printing the test pattern, preliminary discharge (aging) is carried out until the operation of the printhead IJH stabilizes to enable stable printing by the printhead. Aging is performed on an aging tray juxtaposed on a head recovery processor 54, and recovery processing (ink suction, cleaning of orifice surfaces, etc.) is executed in such a manner that the test pattern can be printed normally. When a test pattern is thus printed, the result of printing is moved to the position of the CCD camera 4 and of the image processor 3, where the result of printing is subjected to image processing by these components and compared with parameters for printing evaluation. Processing is executed while taking the items mentioned below into account in relation to density unevenness of printing elements. Density unevenness is a parameter that can be improved.

Density unevenness of an image is produced by a difference in relative density contrast in printing performed by printing elements. The smaller the contrast, the less noticeable density unevenness is to the eye. When printing elements which produce a high-density printing are concentrated somewhat closely together in space, the occurrence of density unevenness becomes apparent.

When the limit on visual discriminating ability is put into the form of a formula from the viewpoint of density unevenness, the following relation is obtained from experiment:

$$\Delta OD = 0.02 \times \Delta Vd$$

(where Vd is the amount of ink discharge.) This equation shows that a disparity in amount of discharge of 1~4 Pl (picoliters) results in a change of 0.02~0.08 in terms of the OD value. In an actual image, density unevenness results from a collection of printing dots causing variation. If a difference in amount of ink discharge on the order of 4 pl occurs between mutually adjacent printing elements, a fairly large difference in contrast is produced between these printing elements. However, in case of a printing density on the order of 300~600 dpi, it is impossible for the human eye to compare density unevenness between mutually adjacent dots in dot units.

When the discriminating limit of the human eye with respect to density unevenness in an image is taken into account, density unevenness data near the discriminating ability of the human eye can be created by (1) performing a density unevenness correction in units of several dots (two to eight pixels, depending upon printing density); and (2) increasing the number of events of image processing (the number of events per printed dot or the number of events in a group of printed dots) (16~1024 dots).

A procedure for creating such density unevenness data will now be described in detail.

Figure 6:
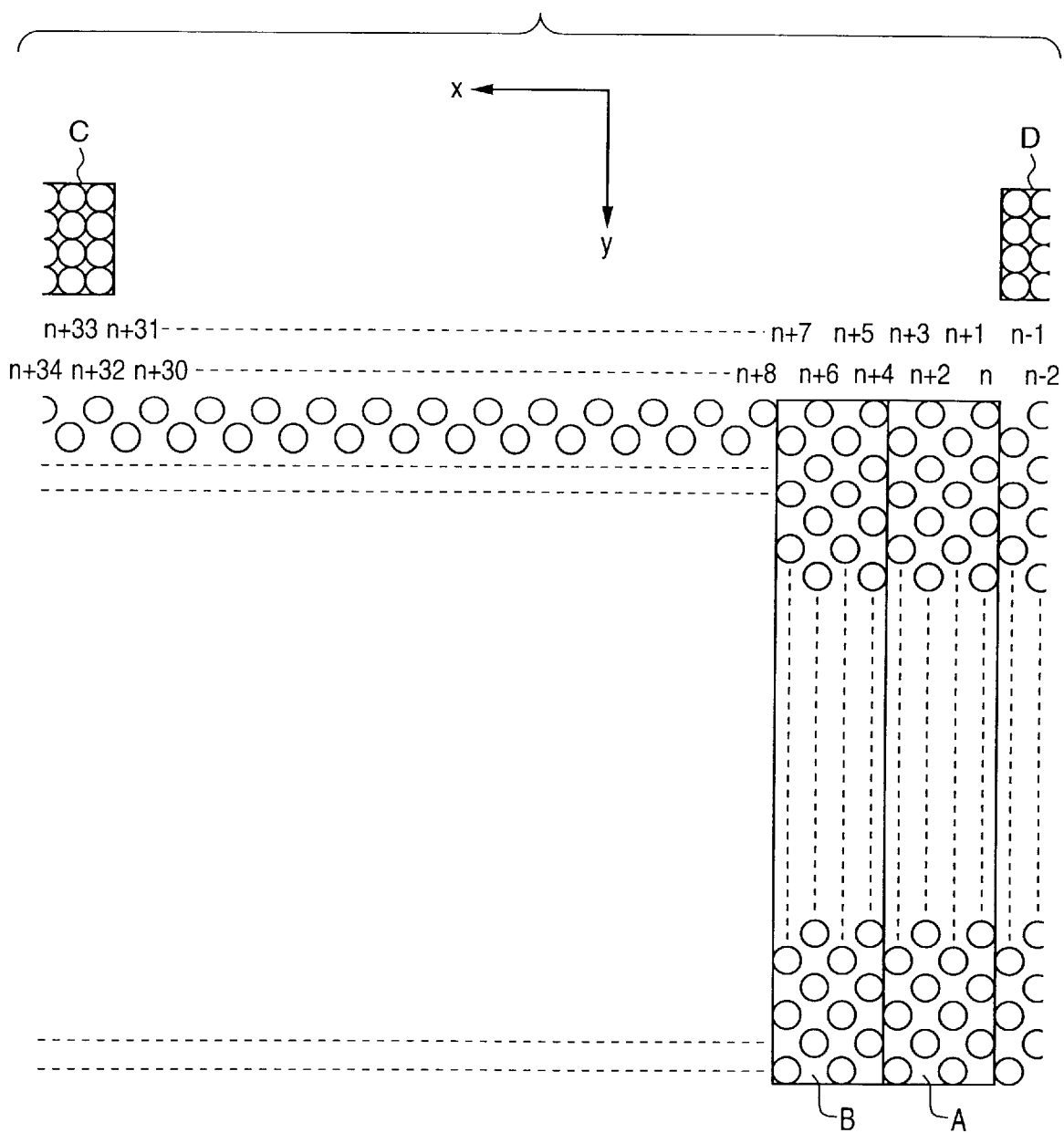
FIG. 6 is a diagram illustrating a test pattern used in this embodiment for correcting density.

FIG. 6 illustrates an example of an image pattern read by a CCD camera or the like. In FIG. 6, a dot pattern having a 50% duty is formed and a dot pattern of 32 dots×32 dots is allocated to the screen area of the CCD camera. In FIG. 6, A and B are areas of 4×32 dots each. In this embodiment, each one is one event. Further, C and D in FIG. 6 are disposed as markers for image recognition of the dot pattern of 32×32 dots.

Let n represent the first dot read. The area A constituting one event is composed of a collection of 32 bits in the y direction (the direction in which the recording medium is conveyed) from n to n+3 in the x direction (the column direction of the printing elements). Eight similar areas are produced in an image memory (not shown), and binarizing processing is performed in each area in accordance with the number of "black" or "white" pixels in the area and a predetermined threshold value. It should be noted that an optimum value obtained experimentally is used as the threshold value. As the result of this binarizing processing, density unevenness data is obtained for every four dots in the x direction.

Further, adopting the absolute density (the total number of black pixels) in each area as the density unevenness data also is effective.

Furthermore, an image having an area corresponding to more than 100 dots per one nozzle of a printing element can be read in and processed by an image scanner, wherein the dot pattern has the 50% duty shown in FIG. 6, and the processed results can be used as the density unevenness data.

Since an event number of more than 100 dots (100 printing operations) per nozzle is obtained with this method, a subtle fluctuation in dot diameter in relation to the y direction is averaged. When density unevenness is discriminated by the human eye, the fluctuation in the y direction is not very noticeable. However, when the number of events is small, the density unevenness does not become density unevenness that can be visually recognized by the human eye and is not appropriate as density unevenness data. The reason is that the data does not become statistical data that is meaningful to the extent that it can be visually discerned by the human eye. If density unevenness data in dot units is obtained in the x direction, several dots of the data can be collected and adopted as density unevenness data. In this case an arrangement may be adopted in which it is possible to externally set the number of dot units. In order to create correction data in units of four dots, as mentioned above, the density unevenness data in units of four dots in the x direction may be averaged.

Accordingly, in a case where the density unevenness data thus obtained is applied to both a printhead manufacturing apparatus and a printer, this application does not cause the construction of both the printhead manufacturing apparatus and the printer to be complicated, and the density unevenness data can be processed in a short period of time in both the printhead manufacturing apparatus and the printer.

With regard to the density unevenness data every four dots obtained as described above, the same data is provided for every four nozzles of the printing.

When density unevenness data is thus obtained, how each element is to be corrected is decided based upon this data. For example, in a case where the driving power of each printing element of the printhead is decided by pulse width, driving pulse-width data applied to an integrated circuit for driving the printhead is selected. As will be described later, in a case where the pulse-width control circuit of the driving integrated circuit makes a selection from several pulse widths, the MAX, MIN of the pulse width selected are decided and a pulse width between these values is set based upon the resolution allowed. The pulse width is set so as to correct the printing density of each element in conformity with the image processing data, and the pulse width is made to correspond to each printing element, whereby it is possible to average the printing densities of the printhead unit. The foregoing is repeated until the above-described processing is finished. When this occurs, the resulting data is stored in the memory 13. This processing is carried out at steps S8~S12 in FIG. 5.

Note that this embodiment can reduce the number of testings performed until it is determined at-step S8 that the testing is OK, compared to the above-mentioned Japanese Patent Application No. 6-34558 (U.S. patent application Ser. No. 08/397,352 filed on Mar. 2, 1995).

(2) Correction Processing in Unit of One Dot

The above described density unevenness data is generated in units of four dots along with the arrayed direction of printing elements in such a manner that the data indicates significant density unevenness in view of human eye's discriminating ability. However, not in a case where an image printed on a paper is visually confirmed by human eyes, but in a case where the image printed on another type of recording medium such as a color filter is read or recognized by an apparatus, density unevenness for each dot greatly influences the image quality.

In such a case, it is necessary to correct image density unevenness for each dot. The following description is directed to a processing for correcting image density unevenness for each dot, using a preheating pulse width in double pulse width control for a printhead as a correction parameter, assuming that the printhead is a type in which one of n pre-heat pulse widths can be selected for each of printing elements arrayed along a line.

Note that the processing corresponds to steps S4 S10 of the flowchart shown in FIG. 5.

First, at step S4, the surface resistivity ($\Omega/\square$) of each unit (element-board 1000) of the printhead is monitored as described above, and applied current duration (sum of preheating pulse width and main heat pulse width) corresponding to each surface resistivity is calculated based on fluctuation of the monitored surface resistivity for each of M arrayed printing units. This calculation is basically obtained from result of simulation on printing elements. Since the printhead is constituted by M arrayed printing units, an averaged current duration is obtained for M printing units. The value of multiplying the obtained average by $\alpha$ ($0 \leq \alpha < 1$) is a preheating pulse width used for obtaining a reference OD value to be described below. Note that this pre-heat pulse width is commonly used for each printing unit.

FIG. 7 is a diagram showing an applied current duration for each printing unit, a preheating pulse width common to each printing unit, and double pulses to be applied to each printing unit. These listed applied current durations take the characteristics of the printhead into consideration. Note that the value of $\alpha$ is empirically obtained from double pulse control on a printhead.

Next, at step S6, the printhead correction apparatus prints (a) a reference pattern using the double pulses shown in FIG. 7, and (b) a test pattern for density correction on a recording medium, using a printhead to be corrected. These patterns are printed in units of approximately 100 dots along with the conveyance direction of the recording medium (y direction) so as to average very subtle fluctuation of each nozzle of the printhead, performing double pulse widths control on the printhead. These printings are repeated n times, changing a preheating pulse width.

Note that the above reference and test patterns are printed after the printing operation of the printhead to be corrected is stabilized.

At step S8, the CCD camera 4 reads the printed reference and test patterns, image-processes them, and converts them into OD values.

FIG. 8 is a table showing OD values, which are obtained from the image processing on the above printed and read test patterns, for each printing element and applied preheating pulse width. Particularly, FIG. 8 shows OD values for each printing element in a case where a preheating pulse width varies from 0.875 μsec to 2.0 μsec by 0.125 μsec and the printing operation is performed 10 times (n=10). It is understood from FIG. 8 that though the preheating pulse width is constant, the OD value fluctuates over each printing element.

In this embodiment, an optimum value is selected from n preheating pulse widths for each printing element as a correction parameter so as to eliminate density unevenness. The optimum value is selected in such a manner that an OD value is equal or close to a reference OD value (described below). For example, if the reference OD value is 0.43, the preheating pulse width as a correction parameter for each printing element is selected in such a manner that a value indicated as ★ in FIG. 8 is selected. If density unevenness is performed using the correction parameter thus selected, the OD value for each printing element becomes nearly constant. As a result of this, density unevenness is eliminated. The number shown in the lowest column of FIG. 8 is a value identifying a selected correction parameter for each printing element.

Figure 9:
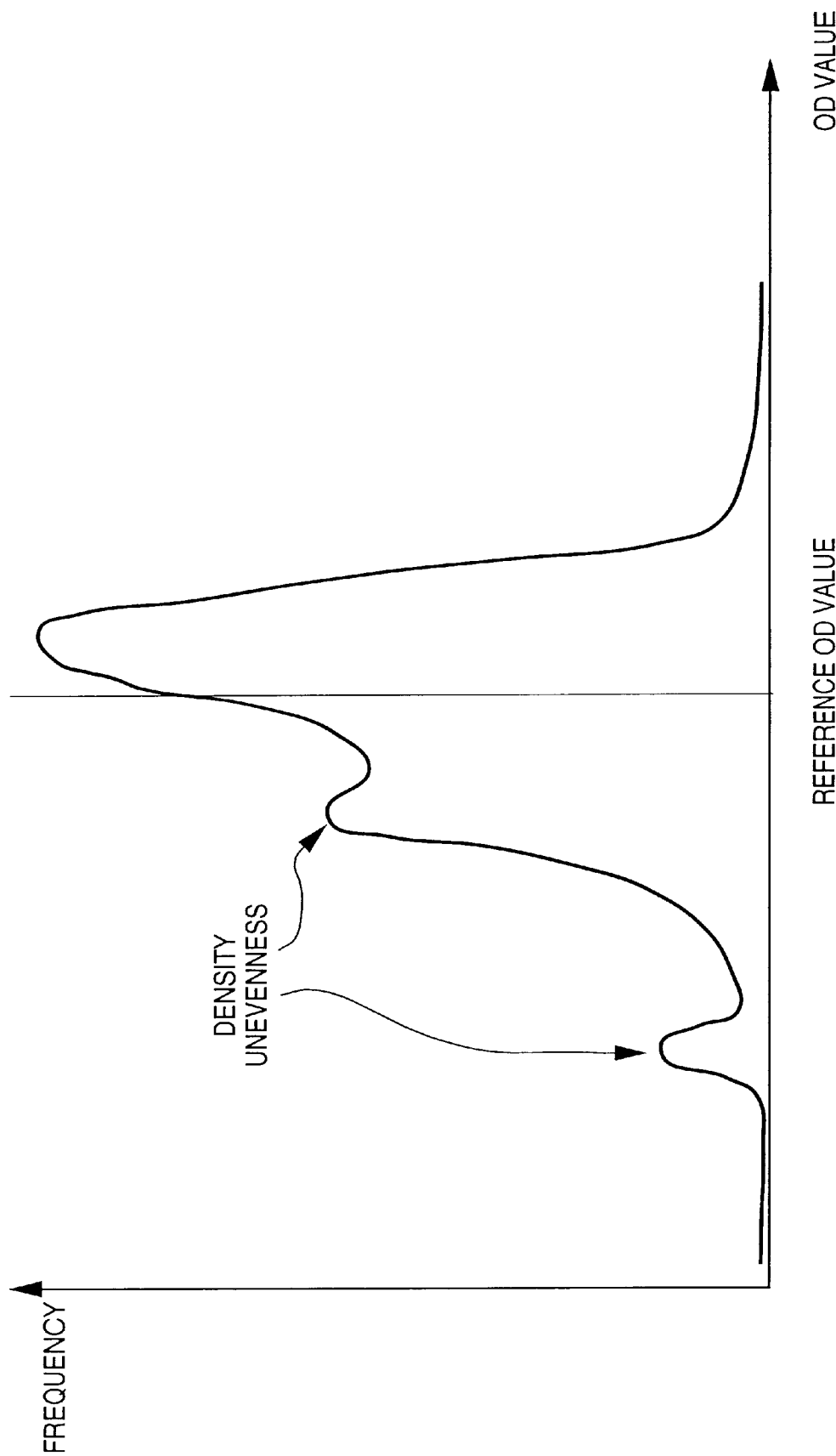
FIG. 9 is a histogram on OD values obtained from printing results of a reference pattern.

Now, we obtain the histogram over the OD values, based on the OD values obtained from the printed reference patterns. FIG. 9 is an example of a histogram on OD values from the reference pattern. Then, we can obtain a reference OD value, based on the statistically processed histogram. The reference OD value may be the maximum, minimum, median, means, mode, dispersion from the mode value, or the like in the histogram. In other words, it can be said that the reference OD value is obtained according to the histogram on OD values from the printed reference pattern reflecting the characteristics of the printhead. Note that a correction term (+β) reflecting fluctuation of quality of a printhead to another in a production lot may be added to the obtained reference OD value such as the means value. Regardless of whether the above correction term is added or not, the reference OD value obtained from the statistical processing on the printed reference patterns always reflects the characteristics (fluctuation of surface resistivity for each printing unit) of the printhead to be corrected.

As described above, FIG. 8 merely refers to the case where the number of printing operations is 10(=n). It goes without saying that the greater the value of n becomes, the more complicated the construction of a correction circuit in a printhead becomes. Thus, in order to reduce density unevenness and produce a high-quality printhead in low-cost, it is important to keep n minimum as much as possible. Generally speaking, density unevenness is visually identified in a case where the difference of OD values between neighboring dots is great. It is empirically or experimentally confirmed that the difference is often a difference between a Gaussian distribution which approximates a histogram on OD values, obtained from printing results of the reference pattern, for each dot, and an OD value greatly deviated from the Gaussian distribution.

Thus, in the histogram on OD values from the reference pattern as shown in FIG. 9, even though the value of n is small, e.g. n=4, if a correction parameter causing a greatly deviated OD value to be adjusted to the reference OD value is provided, density unevenness correction can be sufficiently attained. If n=4, a 2-bit logic selection circuit can be used, thus providing an advantage of keeping the correction circuit in the printer simple. It goes without saying that, even though the value of n is small, further density unevenness correction can be achieved under the condition that there is very few greatly-deviated OD values in the histogram on OD values from the reference pattern, that is, a printhead whose characteristics shows less density unevenness is used.

In a case where characteristics of the printhead are largely influenced by various factors related to the manufacturing process, or in a case where the various factors related to the manufacturing process are accumulated, resulting in a specific distribution characteristic (hereinafter simply referred to as "tendency") of density unevenness, the processing in steps S6 to S10 does not need to be repeated, but correction data may be generated in the following manner to correct these factors and written in the memory 13 of the printhead IJH.

Figure 10:
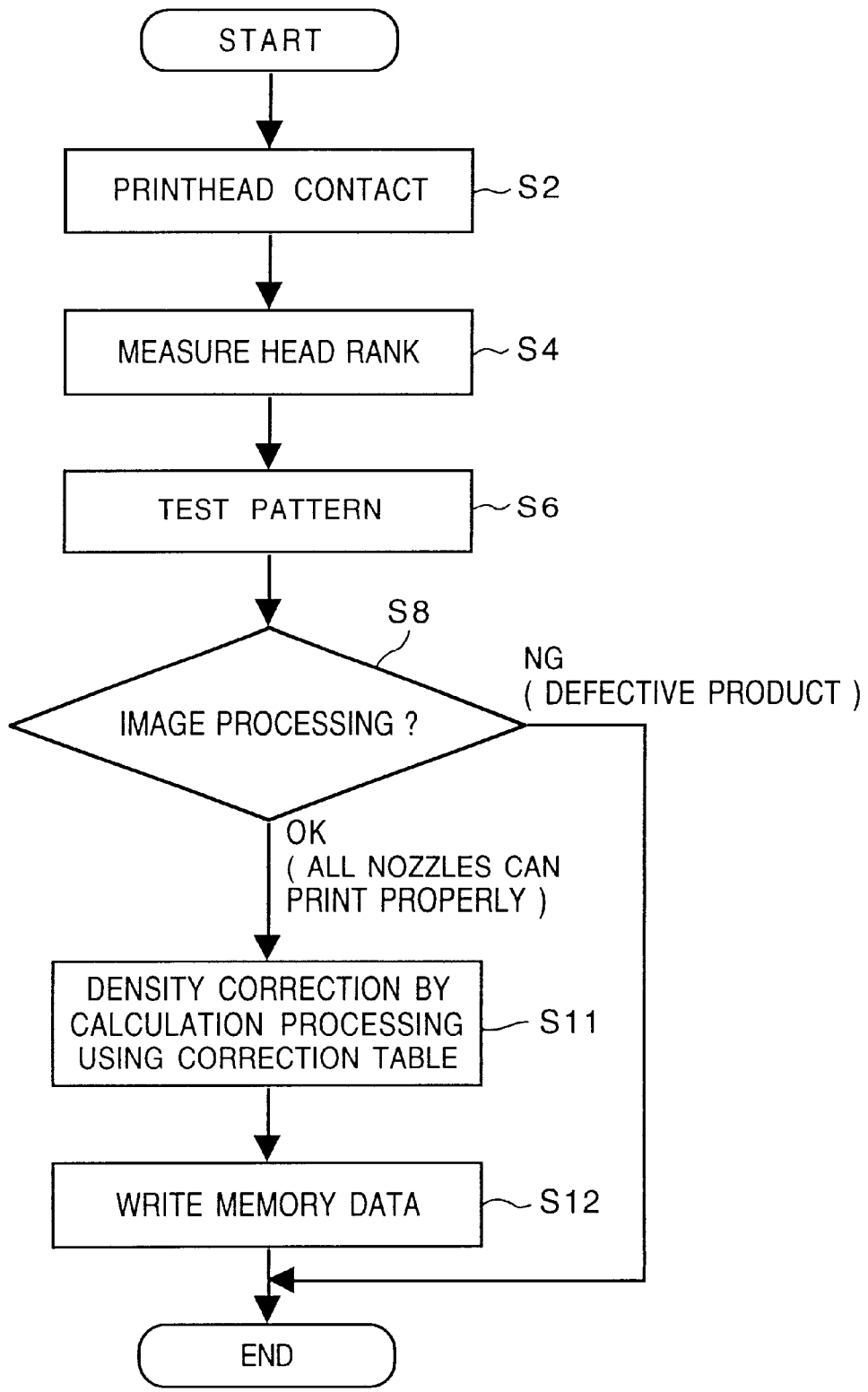
FIG. 10 is a flowchart showing density correction processing performed by calculation processing.

FIG. 10 is a flowchart showing the process of generating correction data for correcting density unevenness caused by various factors related to manufacturing process of a printhead, and the process of writing the correction data in a memory of the printhead. The processing is executed by the printhead correction apparatus. With respect to processing identical to that explained in the flowchart in FIG. 5, the same step reference numbers are assigned, and description thereof will be omitted. In step S6, the above-described reference pattern is printed as a test pattern.

Upon completing the processing in steps S2 to S6, it is determined in the image processing step in step S8 whether or not printing operation has been properly performed by discharging ink from all nozzles of the printhead IJH, in addition to the above-mentioned processing in step S8. If printing operation has been properly performed by discharging ink from all the nozzles, the processing proceeds to step S11. If printing operation has not been properly performed by discharging ink from all the nozzles, the printhead is regarded as defective and the processing is terminated then.

Characteristic processing among the aforementioned series of processes is the calculation processing in step S11. Hereinafter, the processing will be described. In this process, density unevenness caused by various factors related to manufacturing process is corrected.

First, density distribution of image data obtained by the test pattern, on which image processing in step S8 has been performed, is analyzed to determine the tendency of density unevenness. The analysis is performed by executing an analysis program stored in the CPU 1. The tendency is compared, for the purpose of analysis, with the plurality of density-unevenness-tendency correction tables, each reflecting a specific cause related to the manufacturing process. At the time of the comparison and analysis, the correction tables are read out of the memory in the CPU 1.

Figure 11:
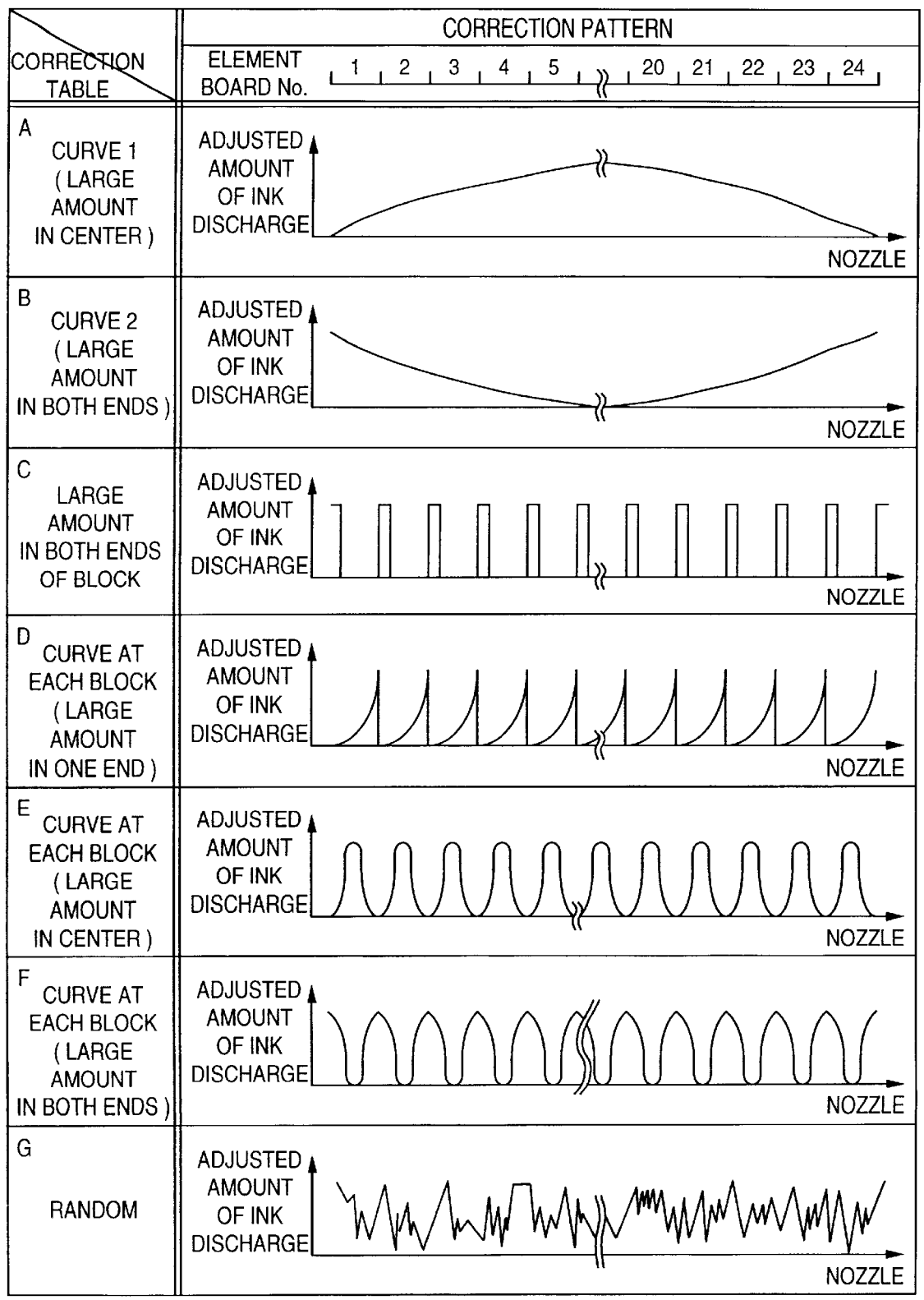
FIG. 11 is a graph showing characteristics of correction tables.

FIG. 11 shows examples of the correction tables.

The tendency of density unevenness which is unique to the printhead manufacturing process or the tendency of density unevenness due to the construction of the printhead can be classified into plural types in accordance with the manufacturing processes, as shown in FIG. 11. In a case of the full-length multiple printhead according to the present embodiment, the printhead is configured by arraying a plurality of element-boards 1000. For instance, a printhead shown in FIG. 14 (described later) is configured by arraying 24 element-boards, on each of which 128 ink discharge nozzles are formed at a density of 360 dpi, thus having the total of 3072 nozzles. Excluding 32 nozzles provided as extra nozzles on both ends of the board, that is, a total of 64 nozzles, the printhead comprises 3008 effective discharge orifices. In such printhead having the foregoing configuration, surface resistivity of both of the end portions of each element-board is different from that of the center portion of each board. As a result, even if a uniform electric current is sent to the element-boards for printing operation, density unevenness sometimes results, generating a white line at the adjoining portion of the element-boards. In other words, the amount of discharged ink is less in the adjoining portion. To correct such specific density unevenness, a correction table having a characteristic such as correction table C (large amount in both ends of block) shown in FIG. 11, where an adjusted amount of ink discharge is large in the adjoining portion of element-boards, is selected and used for density correction.

Moreover, since an ink flow channel on the grooved member 2000 in FIG. 14 is formed in a unit of element-board which is to be inserted in the grooved member, each element-board may have density unevenness. In such case, a correction table having characteristics such as correction table D, E or F shown in FIG. 11 is used so as to correct density unevenness such that the adjusted amount of ink discharge is large at one end portion, or the center portion or both end portions of each element-board. By this process, the correction is emphasized on the portion of density unevenness, as compared to the case of utilizing the normal correction data. Accordingly, an image having a uniform quality in view of human eyes can be formed.

In a case where the entire base plate 3000 (described later) in FIG. 14 is totally curved, causing density unevenness, a correction table having characteristics such as correction table A or B in FIG. 11 is used for correcting the density unevenness. Furthermore, in a case where density unevenness occurs over the entire printing width of the printhead, a correction table having a characteristic such as correction table G in FIG. 11 is used to correct the density unevenness.

Note that the correction performed by utilizing various correction tables in FIG. 11 is performed by executing generation programs stored in the memory incorporated in the CPU 1, whereby generating density correction data. In reality, the correction is performed by adjusting a preheating pulse width, main-heating pulse width and a quiescent interval period, which will be described later. Correction data used for the adjustment is stored in the memory 13 in a unit of four nozzles or a unit of each nozzle of the printhead IJH.

As has been described above, density unevenness caused by the manufacturing process of a printhead is corrected based on the density unevenness detected by performing image processing on a printed test pattern. Such correction is applicable to a case where characteristics of a driving method of a printer incorporating the printhead are corrected, or when correction is performed in accordance with a printing area, or the like. Accordingly, it is possible to emphasize the density unevenness correction in accordance with the way the printhead is utilized.

Figure 12:
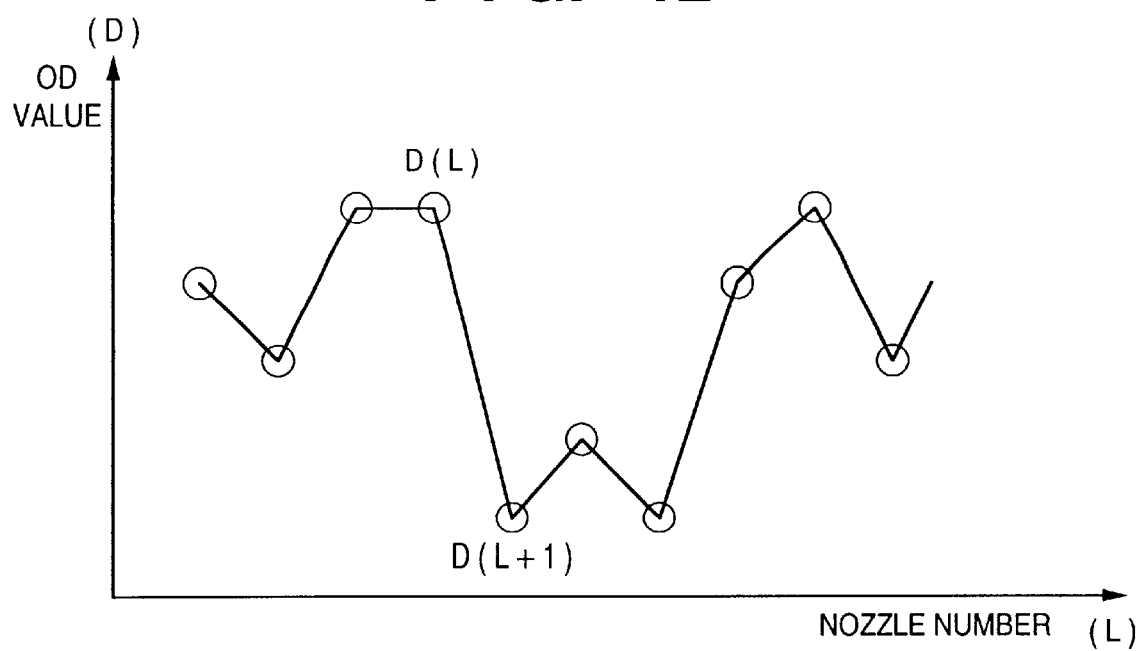
FIG. 12 is a graph showing variance of OD values for each nozzle.

As has been mentioned above, the larger the difference in printing density of neighboring nozzles, the more the density unevenness becomes conspicuous in view of human eyes. To cope with this situation, a print density difference (herein, difference in OD values) between the neighboring nozzles is obtained on the basis of the variance in OD values shown in FIG. 12, resulting from the difference in ink discharge nozzles which is obtained by the processing in steps S6 and S8. Density correction in step S11 of the flowchart in FIG. 10 may be performed based on the obtained difference (D(L+1)−D(L)). Note that "L" indicates a nozzle number assigned to a nozzle of the printhead IJH.

Figure 13A:
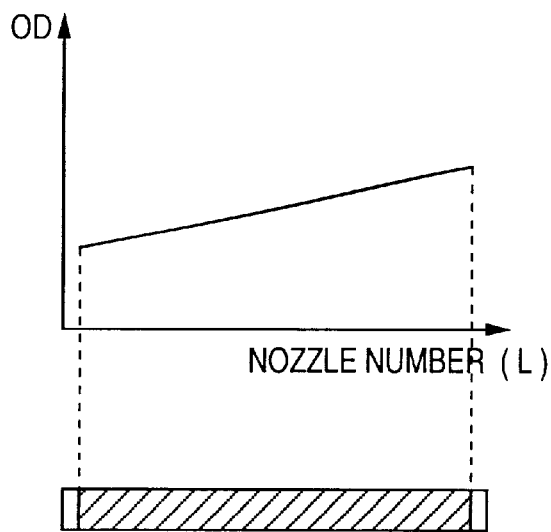
FIGS. 13A and 13B are graphs showing variances of OD values, in a case where density unevenness is conspicuous and a case where the unevenness is inconspicuous.
Figure 13B:
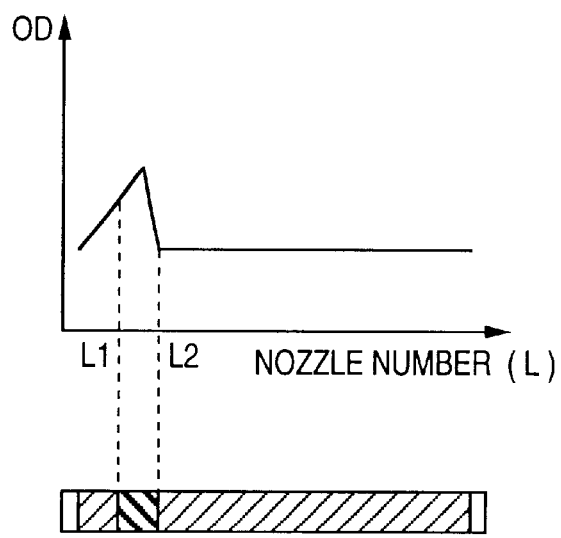

For instance, in a case where a variance of OD values of the printhead subjected to correction has the pattern shown in FIG. 13A or FIG. 13B, the density unevenness is conspicuous in the area of nozzle numbers L1 to L2 in FIG. 13B. When performing density correction in the above-described manner, the difference of OD values can be reflected upon the correction data particularly with respect to this area, thereby enabling to emphasize the density unevenness correction.

As described above, by providing means for emphasizing density unevenness correction, it is possible to correct density unevenness so as to attain image quality more natural to the human eye.

FIG. 14 is an exploded perspective view for describing the construction of the printhead according to the present embodiment. In this example, a case is described in which the printing elements are elements for generating ink-discharge energy used to jet ink. (In an ink-jet printing method, each element comprises a pair of electrodes and an electrothermal transducer including a heating resistor element provided between these electrodes).

In accordance with the method described below, the full-line printhead, which is faultlessly fabricated over its entire width by a conventional photolithographic process or the like, is obtained at a very high yield. Moreover, a single, unitary grooved member having a plurality of ink discharge orifices formed in one end and a plurality of grooves connected to these orifices and formed in the grooved member from one end to the other is joined to this printhead in such a manner that the grooves are closed by the boards, whereby a full-line, ink-jet printhead unit can be constructed in a very simple manner.

The ink-jet printhead described in this embodiment has ink discharge orifices at a density of 360 dpi (70.5 μm), the number of nozzles thereof being 3008 (for a printing width of 212 mm).

In FIG. 14, the element-board (hereinafter referred to as a heater board) 1000 integrating printing elements has 128 discharge-energy generating devices 1010, which are electrothermal transducers for generating thermal energy, arranged at prescribed positions at a density of 360 dpi. Each heater board 1000 is provided with a signal pad to drive the discharge-energy generating devices 1010 at any timing by externally applied electric signals, and with a power pad 1020 for supplying an electric power for the driving.

The row of the heater boards 1000 is fixedly bonded by a bonding agent to the surface of a base plate 3000 made of a material such as metal or ceramic.

Figure 15:
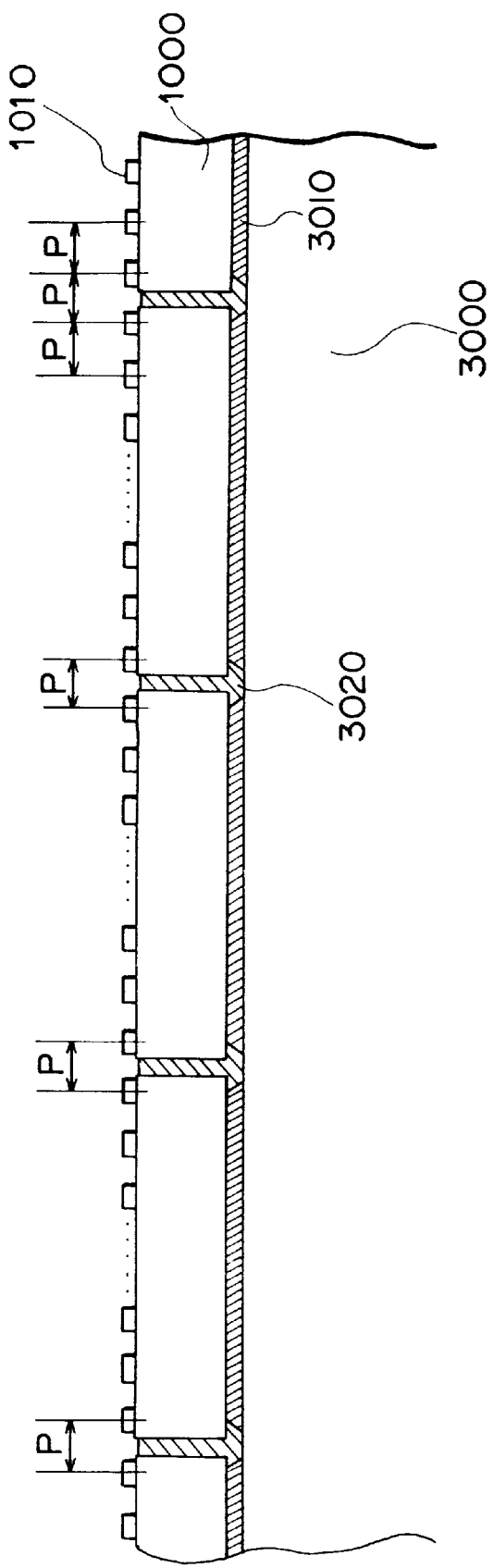
FIG. 15 is a detailed view showing heater boards arranged side by side.

FIG. 15 is a detailed view showing the heater boards 1000 in the arrayed state. The heater boards are fixedly bonded to a prescribed location on the base plate 3000, as a supporting member, by a bonding agent 3010 applied to a prescribed thickness. At this time each heater board 1000 is fixedly bonded in precise fashion in such a manner that the spacing or pitch between the discharge-energy generating devices 1010 situated at the respective edges of two mutually adjacent heater boards will be equal to the spacing or pitch P (=70.5 μm) of the discharge-energy generating devices 1010 on each heater board 1000. Further, the gaps produced between adjacent heater boards 1000 are filled and sealed by a sealant 3020.

With reference again to FIG. 14, a wiring board 4000 is fixedly bonded to the base plate 3000 in the same manner as the heater boards. At this time the wiring board 4000 is bonded to the base plate 3000 in a state in which the pads 1020 on the heater boards 1000 are in close proximity to signal-power supply pads 4010 provided on the wiring board 4000. A connector 4020 for receiving a printing signal and driving power from the outside is provided on the wiring board 4000.

A grooved member 2000 will now be described.

The grooved member 2000 comprises a plurality of grooves, each connecting to an orifice and forming a fluid channel by combining with the element-boards (heater boards).

Figure 16D:
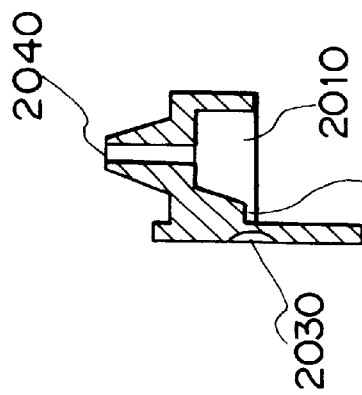
FIGS. 16A, 16B, 16C and 16D illustrate the shape of a grooved member.
Figure 16A:
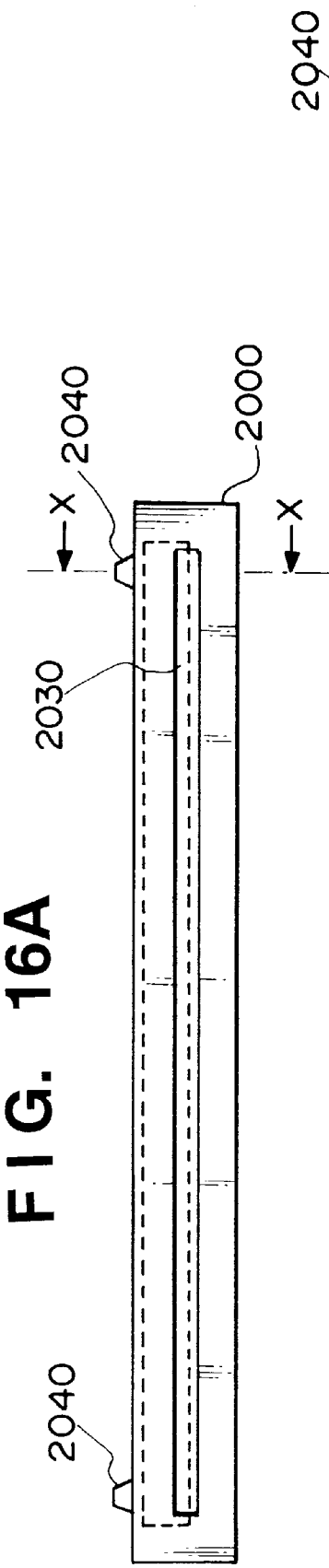
Figure 16B:
Figure 16C:
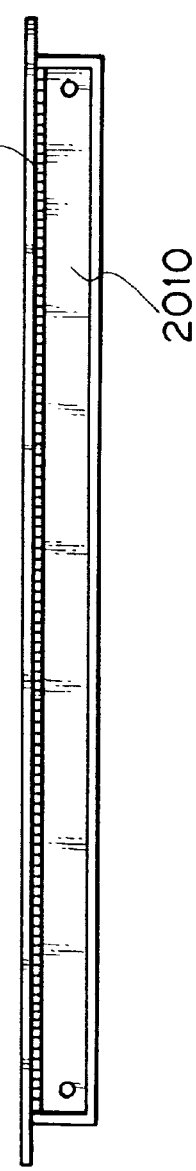

FIGS. 16A~16D are diagrams showing the shape of the grooved member 2000. FIG. 16A is a front view in which the grooved member 2000 is seen from the front, FIG. 16B a top view in which FIG. 16A is seen from the top, FIG. 16C a bottom view in which FIG. 16A is seen from the bottom, and FIG. 16D a sectional view taken along the line X—X of FIG. 16A.

In FIGS. 16A~16D, the grooved member 2000 is shown to have a flow pass 2020 provided to correspond to each discharge-energy generating element 1010 provided in the heater board 1000, an orifice 2030 corresponding to each flow pass 2020 and communicating with the flow pass 2020 for discharging ink toward the recording . medium, a liquid chamber 2010 communicating with each flow pass 2020 in order to supply it with ink, and an ink supply port 2040 for feeding ink, which has been supplied from an ink tank (not shown), to the liquid chamber 2010. The grooved member 2000 naturally is formed to have a length large enough to substantially cover the row of discharge-energy generating devices arranged by lining up a plurality of the heater boards 1000.

With reference again to FIG. 14, the grooved member 2000 is joined to the heater boards 1000 in a state in which the positions of the flow pass 2020 of the grooved member 2000 are made to exactly coincide with the positions of the discharge-energy generating elements (heaters) 1010 on the heater boards 1000 arranged in a row on the base plate 3000.

Conceivable methods of joining the grooved member 2000 are a method in which the grooved member is pushed in mechanically using springs or the like, a method in which the grooved member 2000 is fixed by a bonding agent, and a method which is a combination of these methods.

Figure 17:
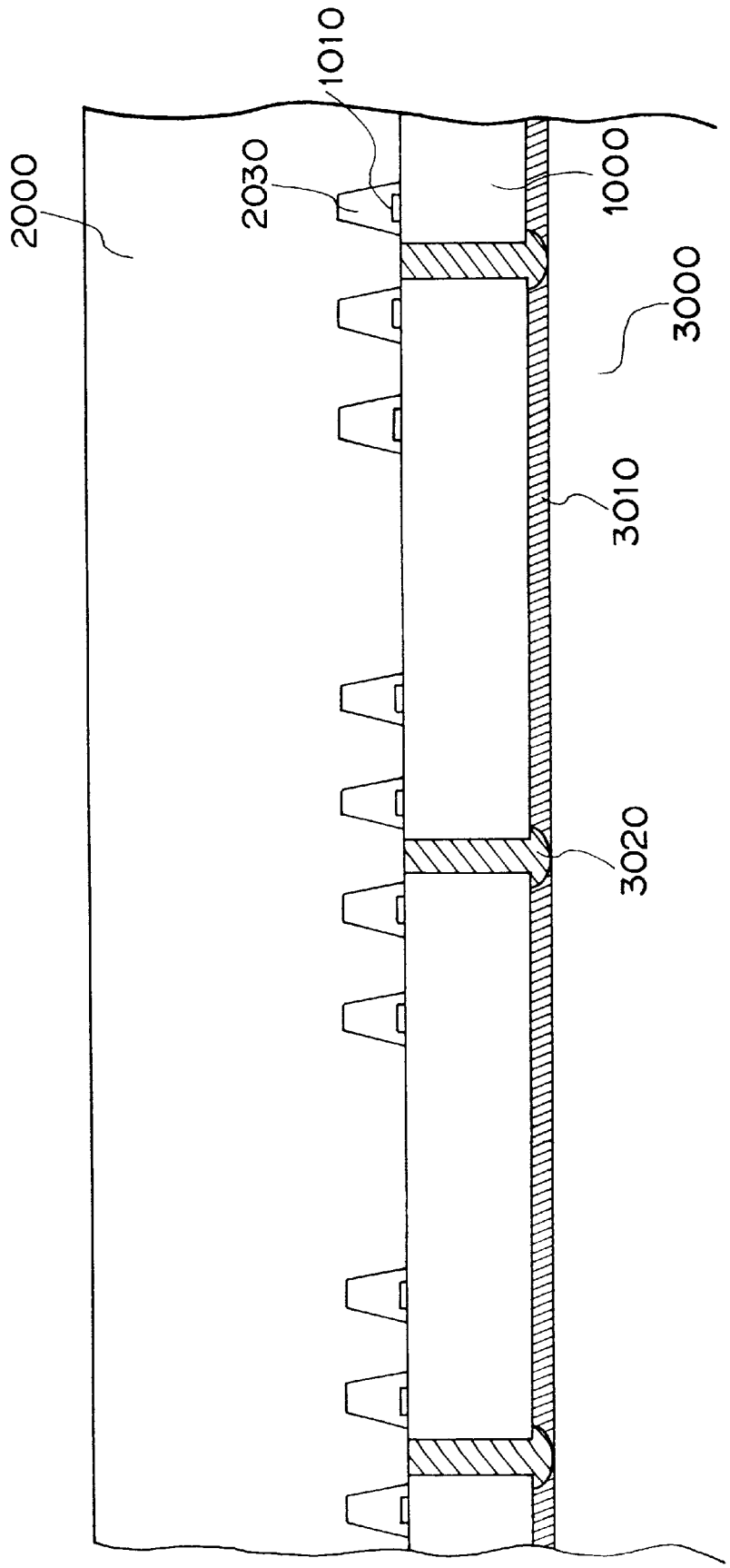
FIG. 17 is a diagram showing the grooved member and heater boards in a fixed state.

The grooved member 2000 and each of the heater boards 1000 are secured in the relationship shown in FIG. 17 by any of these methods.

The grooved member 2000 described above can be manufactured using well-known methods such as machining by cutting, a molding method, casting or a method relying upon photolithography.

FIG. 18 shows an example of drive circuitry provided on the heater board 1000 of the printhead. Numeral 100 denotes a base, 101 a logic block for selecting preheating pulses, 303 a latch for temporarily storing image data, 102 a selection-data saving latch, having the same circuit arrangement as the latch 303, for selecting preheating pulses, and 103 an OR gate for taking the OR of heating pulses and preheating pulses.

The operation of this drive circuitry will now be described in line with a driving sequence.

After power is introduced from a logic power source 309, preheating pulses are selected in dependence upon the characteristic of the amount of ink discharged (per application of a pulse at a fixed temperature). The characteristic is measured in advance. Data of each nozzle (the data is identical for one or four nozzle(s)) for selecting the preheating pulses in dependence upon the aforesaid characteristic is saved in the selection-data saving latch 102 using a shift register 304 for entering image data serially. Since shared use is made of the shift register 304 for entering image data, it will suffice merely to increase the number of latch circuits and latch the outputs of the shift register 304 as input signals in parallel fashion, as shown at points a in FIG. 18. This makes it possible to prevent an increase in the surface area of the elements other than that of the latch circuits. Further, in a case where the number of preheating pulses is increased and the number of bits necessary for selection of the number of pulses surpasses the number of bits of the shift register 304, this can readily be dealt with if the latch 102 is made plural in number and a latch-clock input terminal 108 which decides latching is made plural in number, as shown at 108a~108h. It will suffice if the saving of data for selection of the preheating pulses is performed one time, such as when the printer is started up. The image-data transfer sequence will be performed exactly the same as conventionally even if this function is incorporated. Furthermore, an arrangement may be adopted in which the number of bits in logic block 101 and in the selection-data saving latch 102 is made one-fourth, the preheating pulses are selected in units of four nozzles and are supplied in units of four nozzles.

Entry of heating signals will now be described as a sequence with follows completion of the storing of saved data, representing the amount of ink discharge, for selection of preheating pulses.

A characterizing feature of this board is that a heating input terminal 106 and a plurality of preheating input terminals 107a~107h, which are used for changing the amount of ink discharged, are separately provided. First, a signal from the heating-resistor monitor 314 is fed back and a heating signal having a pulse width of an energy suited to discharge of ink in dependence upon the value of feedback is applied to the heating input terminal 106 from the side of the printing apparatus. Next, the pulse width and timing of each of the plurality of preheating signals are changed in dependence upon the value from the temperature sensor 315 and, at the same time, preheating signals are applied from the plurality of preheating pulse terminals 107a~107h in such a manner that the amount of ink discharged will vary under fixed temperature conditions. Thus, if a selection is made to deal with a factor other than temperature, namely a change in the amount of ink discharge of each nozzle, the amount of ink discharge can be rendered constant to eliminate unevenness and blurring. One of the plurality of preheating pulses thus entered is selected in dependence upon selection data saved in advance in the preheat selection logic block (latch) 102. Next, an AND signal between the image data and heating signal is OR-ed with a selected preheating pulse by the OR gate 103, and the resulting signal drives a power transistor 302, thereby passing an electric current through the heater 1010 to discharge ink.

Shown in FIG. 18 are an input signal input terminal 104, a clock input terminal 105, a latch signal input terminal 307, a ground terminal 310, a power-supply voltage input terminal 311 for heating purposes, an output terminal 312 for heating-resistor monitoring data, and an output terminal 313 for data indicating the temperature inside the printhead.

Figure 19:
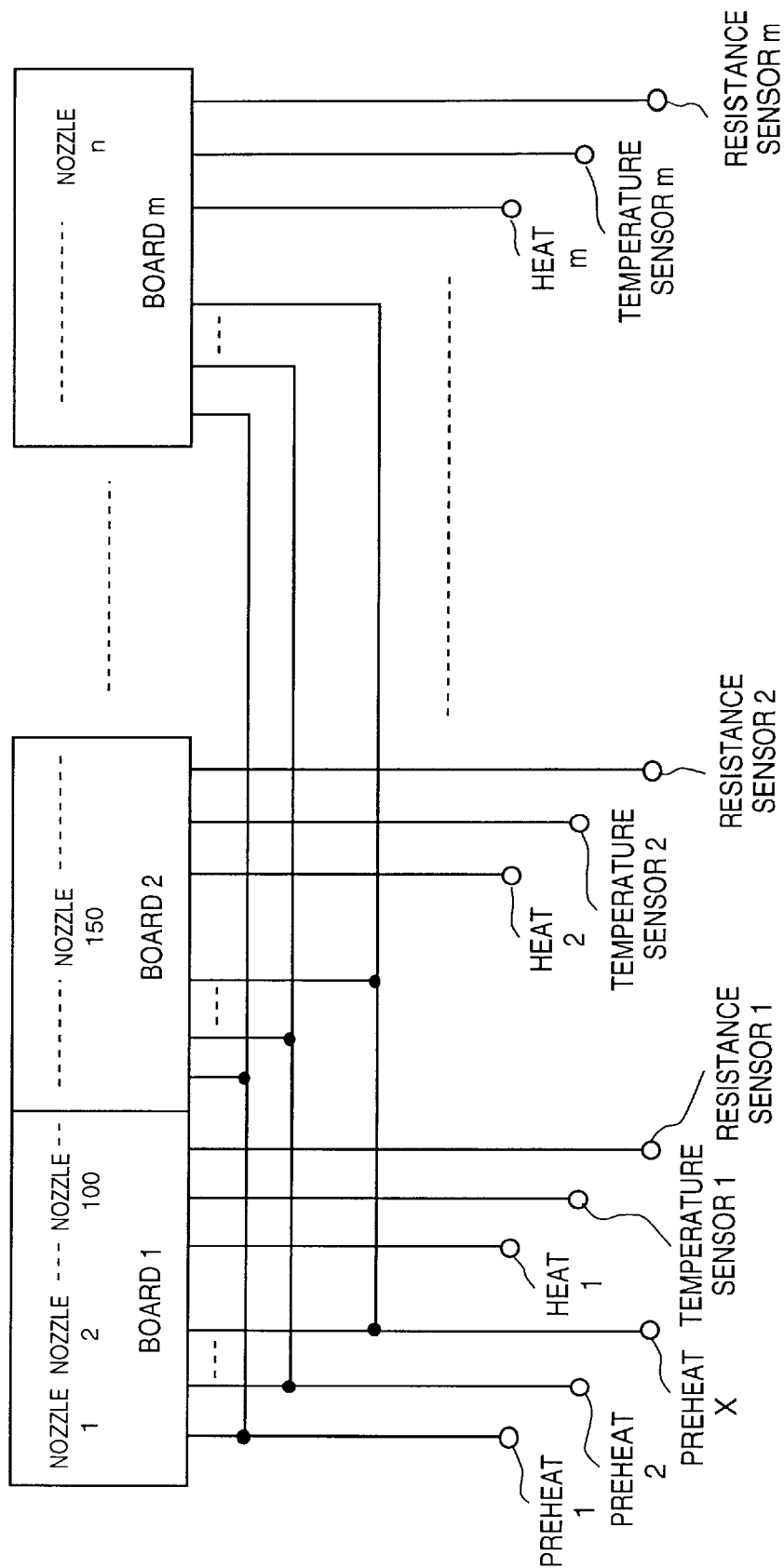
FIG. 19 is a block diagram showing a multiple-nozzle head constituted by an array of a plurality of heater boards.

Reference will be made to FIG. 19 to describe the construction of a multiple-nozzle head constituted by a plurality of the heater boards 1000 arranged in a row. There are m-number of boards in the row and a total of n-number of nozzles. The description will focus on nozzles 1, 100 of board 1 and nozzle 150 of board 2.

Figure 20:
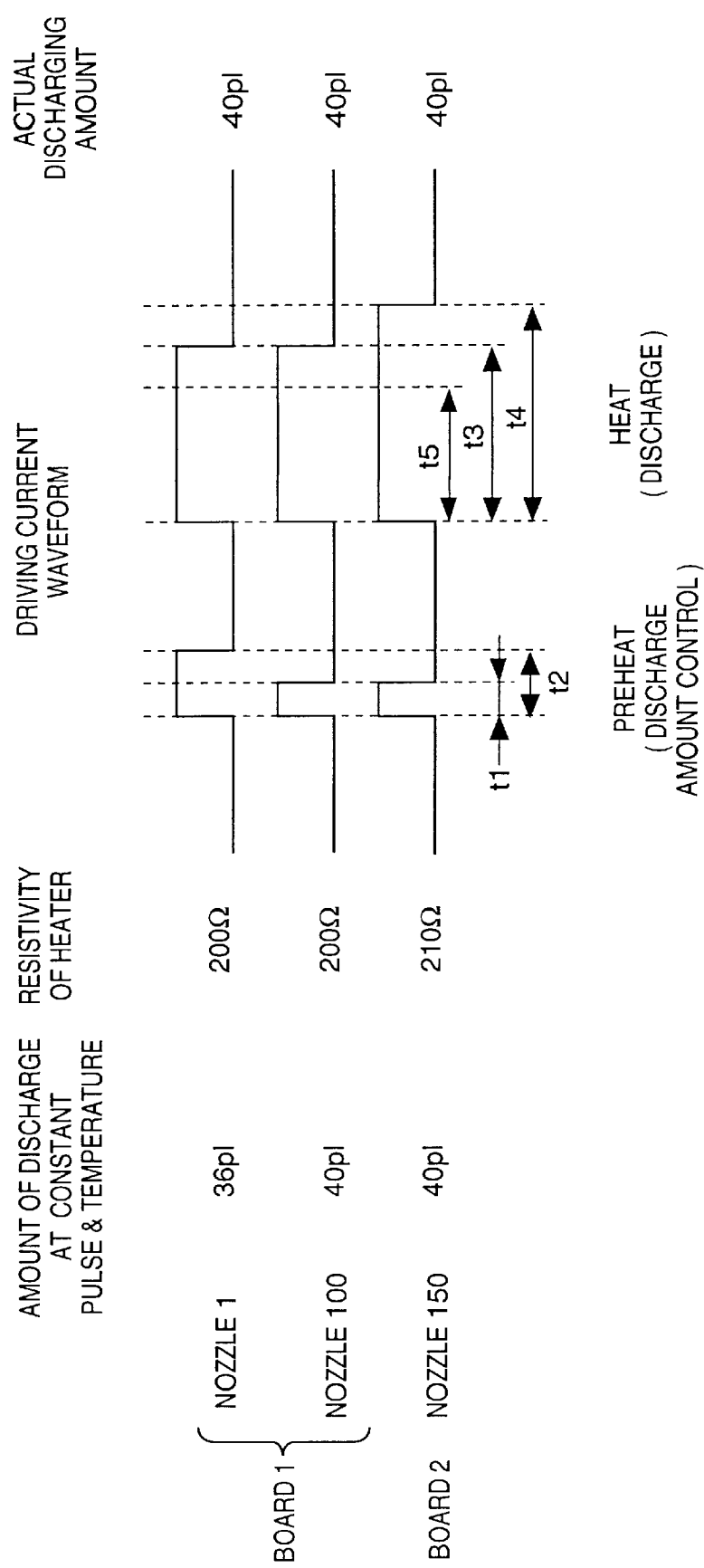
FIG. 20 is a diagram showing an example of control of driving current waveforms for driving the printing elements.

As shown in FIG. 20, assume that the amounts of ink discharged by nozzles 1, 100 and 150 are 36 pl, 40 pl and 40 pl, respectively, at application of a constant pulse width at a constant temperature. In such case, selection data having a level such that the amount of ink discharged will be greater for nozzle 1 than for nozzles 100 and 150, is set in the selection-data saving latch. Since it is known from resistance sensors 1, 2 that 200 Ω is the heating-resistance value of board 1 and that 210 Ω is the heating-resistance value of board 2, as shown in FIG. 20, the pulse width applied to board 2 is made larger than that applied to board 1 so that the introduced power will be rendered uniform. FIG. 20 illustrates driving current waveforms applied under these conditions. It will be understood that the preheating pulse of nozzle 1 which discharges a small amount of ink has a pulse width larger than that of the preheating pulses for nozzles 100 and 150 (t1<t2). Further, the heating pulse width t4 is larger than t3 (t4>t3). In FIG. 20, t5 represents the pulse width for minimum power needed to foam the ink and cause the ink droplets to be discharged from the nozzles. The following relationships hold: t1, t2<t5 and t3, t4>t5.

Thus, the preheating pulses are changed under conditions in which the relations t1<t2; t1, t2<t5 hold with respect to a change in the temperature of the board during drive. As a result, the amount of ink discharged from each nozzle during actual drive can be made 40 pl at all times. This makes it possible to achieve high-quality printing without unevenness and blurring. Furthermore, with regard to the heating pulses exhibiting a high power, the pulse width is adjusted in dependence upon the resistance value of the board, whereby a constant power is applied without waste. This contributes to a longer service life for the printhead.

Figure 21:
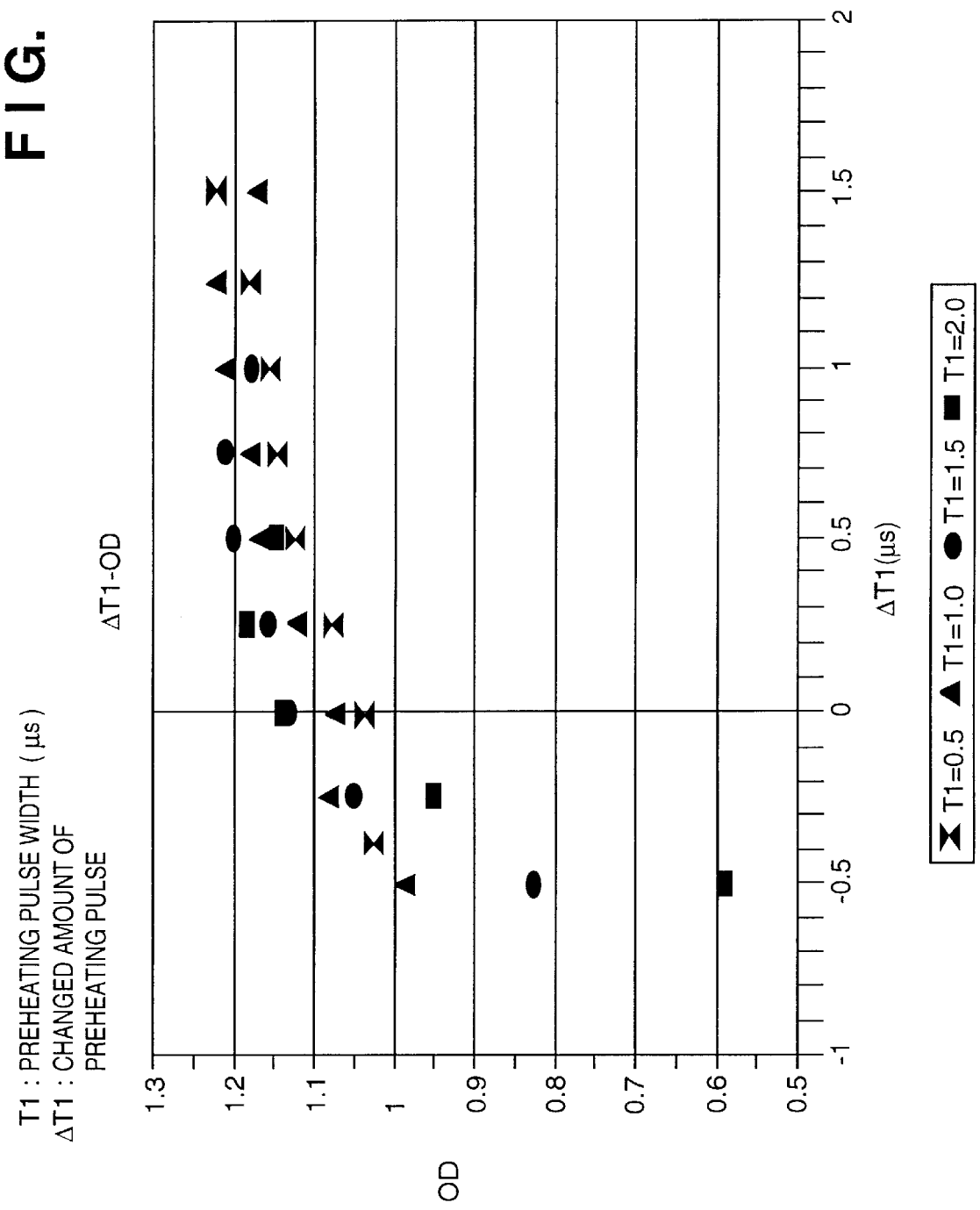
FIG. 21 is a diagram showing the relationship between an OD value and preheating pulses.

FIG. 21 illustrates a change in OD value in a case where the preheating pulses are changed.

Figure 22:
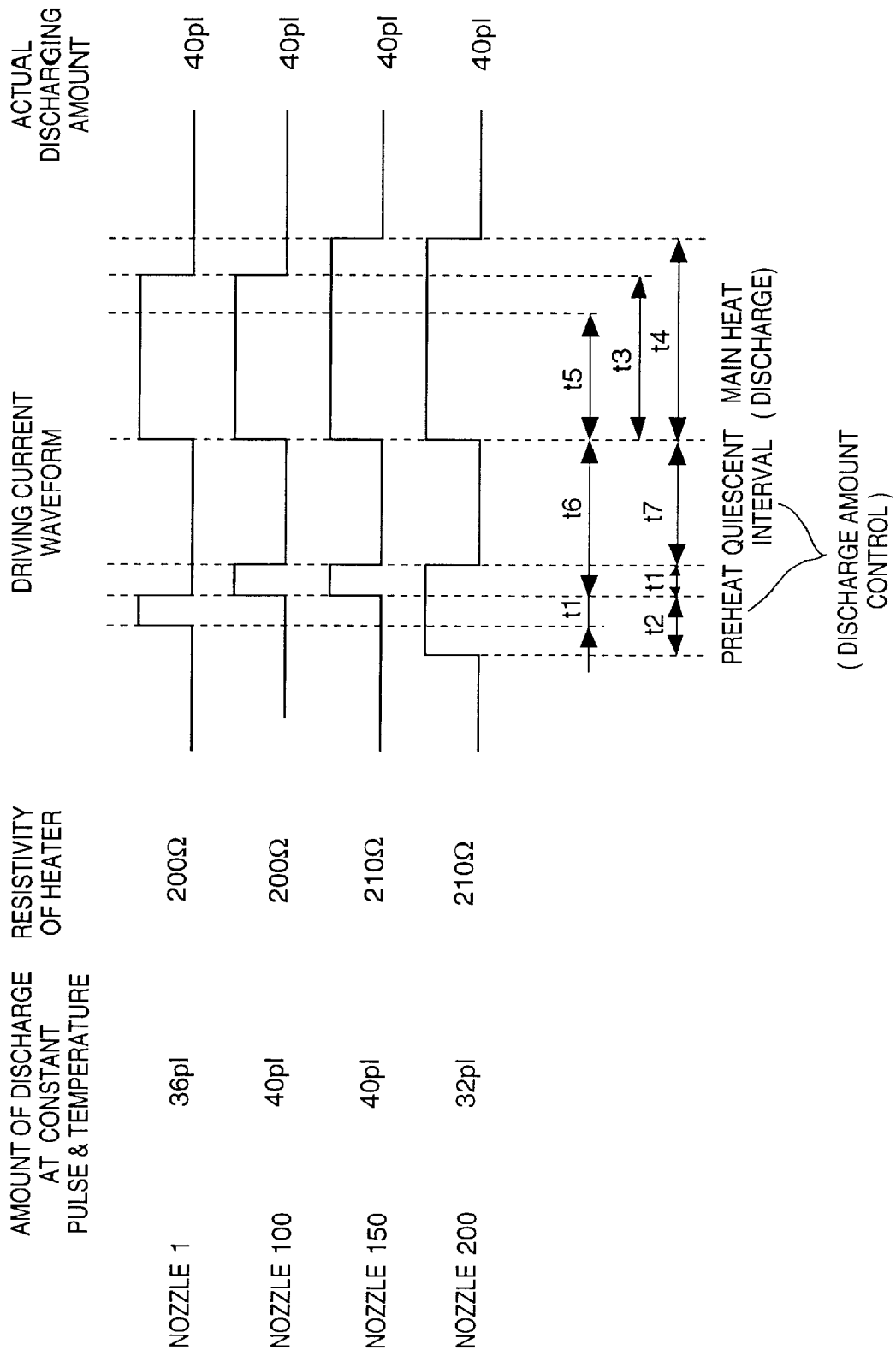
FIG. 22 is a diagram showing driving current waveforms for driving the printing elements of this embodiment.

In a case where there is a very large density unevenness between nozzles (e.g., a case where the amount of ink discharge of nozzle 200 at a constant pulse width and temperature is 32 pl, which is 20% less than the amount of ink discharge of nozzles 100 and 150, as shown in FIG. 22), the preheating pulses fluctuate by more than 0.5 μsec from the usual value, depending upon the particular case, owing to the correction. For example, if a drive pulse which is equivalent to a single heating pulse is on the order of 4 μsec, a pulse which is approximately 15% longer than usual is applied to a printing element discharging ink which represents a low density. This has the effect of shortening the service life of the printhead. Further, when the change in a heating pulse is large, the change in the OD value also becomes very large, as shown in FIG. 21.

Accordingly, in this embodiment, an interval (referred to as a quiescent interval) in which heating pulses are not applied is provided between preheating and main heating of the printhead, as shown in FIG. 22, thereby changing the printing density. As a result, there is no shortening in the life of the printhead. FIG. 23 illustrates a change in the OD value in a case where the preheating pulse width and main heating pulse width are fixed and the quiescent interval is changed.

As a result, if emphasis is placed upon a change in the quiescent interval and a printed dot which cannot be corrected within the range of this change is corrected utilizing the preheating pulses as well, then a large change in energy need not be applied to the printing elements of the printhead, the life of the printhead can be extended and the quality of a printing image can be improved.

In this embodiment, the application of drive pulses differs from that shown in FIG. 20 with regard particularly to nozzle 1 and nozzle 200, as shown in FIG. 22. With regard to nozzle 1, density is somewhat lower in comparison with nozzles 100 and 150 (the amount of reduction in ink discharge is 10%). Therefore, the quiescent interval is made slightly longer (t6) in comparison with that (t7) for nozzles 100 and 150. On the other hand, with regard to nozzle 200, there is a very large difference in density in comparison with nozzles 100 and 150 (the amount of reduction in ink discharge is 20%). Therefore, while the interval time is lengthened (t6), the preheating pulse width is stretched (t2) in comparison with the heating pulse width (t1) of nozzles 1, 100 and 150 to correct the amount in ink discharge. If this arrangement is adopted, a correction of density unevenness can be achieved without applying a large change in energy to the printing elements of the printhead.

Thus, according to the present embodiment, the tendency of density unevenness is analyzed on the basis of density distribution obtained from a test pattern on which image processing has been performed, a correction table corresponding to the tendency is selected, and based on the correction table, the amount of ink discharge is corrected for each nozzle (printing element) of the printhead, or based on the variance of OD values on nozzle (printing element) to nozzle of the printhead, density correction is performed particularly on the portion where the variance is large.

By virtue of the above-described operation, density unevenness caused by various factors related to the manufacturing process of a printhead is reduced, thus making it possible to perform high quality image printing.

Furthermore, in a case where the amount of ink, discharged from each nozzle of the printhead at each printing operation, is to be adjusted by utilizing the correction data obtained based on the foregoing density correction, the period of the quiescent interval between the preheating pulse width and main heating pulse width is adjusted, in addition to the preheating and main heating pulse widths and the timing of these pulses' application. By this, even if the amount of ink discharge largely varies between each of the nozzles under the condition of a constant pulse width and/or constant temperature, it is possible to control the amount of ink discharged from each of the nozzles to be kept equal, without extending the pulse width to the point that the load on the printhead is abnormally large. Accordingly, not only high image quality can be achieved, but also longer service life of the printhead can be attained.

Furthermore, it goes without saying that the present invention may be applied to effect density correction if the board is such that control of the driving power of each printing element is possible. The same density correction can be performed even if the printhead has a construction different from that described.

In the description given above, it is described that the control unit on the side of the printing apparatus controls the printing operation of the printhead on the basis of correction data that has been stored in a memory within the printhead. However, an arrangement may be adopted in which such a control unit is provided within the printhead.

Though a full-line printer has been taken as an example in the description given above, the invention is not limited to such a printer. For example, in a serial printer of the type in which printing is performed by moving a printhead mounted on a carriage, the invention is applicable to an arrangement in which the printing is carried out by a number of nozzles arrayed in a row in the direction in which the recording paper is conveyed. Also, this invention is applicable to another type of printhead such as an ink jet printhead, thermal printhead or LED printhead.

It goes without saying that equivalent effects are obtained even if there is a difference in the method of setting the driving power of each of the printing elements of the printhead.

Each of the embodiments described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of a so-called on-demand type and a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse-form driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

In addition, not only an exchangeable chip type printhead, as described in the above embodiment, which can be electrically connected to the apparatus main-unit and can receive an ink from the apparatus main unit upon being mounted on the apparatus main unit but also a cartridge type printhead in which an ink tank is integrally arranged on the printhead itself can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printhead or by combining a plurality of printheads.

Moreover, in each of the above-mentioned embodiments of the present invention, it is assumed that the ink is a liquid. Alternatively, the present invention may employ an ink which is solid at room temperature or less, or an ink which softens or liquefies at room temperature, or an ink which liquefies upon application of a printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In the present invention, the above-mentioned film boiling system is most effective for the above-mentioned inks.

In addition, the ink-jet printer of the present invention may be used in the form of a copying machine combined with a reader, and the like, or a facsimile apparatus having a transmission/reception function in addition to an image output terminal of an information processing equipment such as a computer.

The present invention can be applied to a system constituted by a plurality of devices or to an apparatus comprising a single device. Furthermore, it goes without saying that the invention is applicable to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for correcting a printing density characteristic of a printhead having a plurality of printing elements and memory means capable of storing data, and providing the corrected printhead for a printing apparatus for use of actual printing, comprising:

storage means for storing a plurality of correction tables each corresponding to a tendency of density variance, in a printed image, caused by a structure of the printhead;

selecting means for selecting the most appropriate correction table from the plurality of correction tables, in accordance with a tendency of density variance in an image test-printed by the printhead subjected to correction; and outputting means for outputting correction data based on the correction table selected by said selecting means, to the memory means of the printhead subjected to correction.

2. The apparatus according to claim 1, further comprising:

print control means for test-printing a print pattern on a recording medium by using the printhead subjected to correction; and analyzing means for analyzing a tendency of density variance in an image of the print pattern printed on the recording medium, wherein said selecting means selects the most appropriate correction table on the basis of the analysis result of said analyzing means.

3. The apparatus according to claim 2, further comprising generating means for, by performing calculation on the basis of the correction table selected by said selecting means, generating correction data used for suppressing density unevenness caused by printing an image by the printhead subjected to correction, wherein said outputting means outputs the correction data generated by said generating means.

4. The apparatus according to claim 1, wherein the plurality of correction tables include data reflecting various factors related to a manufacturing process of the printhead.

5. The apparatus according to claim 4, wherein in a case where the printhead includes N×M number of printing elements and the printhead is configured by connecting M number of circuit boards having N number of printing elements such that the circuit boards are arrayed in a line, said various factors include: deviations at a connected portion of the circuit boards, a bend generated by the M number of entire circuit boards being connected, and a bend generated by each of the M number of circuit boards.

6. The apparatus according to claim 3, wherein said analyzing means includes calculating means for calculating a print density difference between each of neighboring printing elements, with respect to print density of each of the printing elements.

7. The apparatus according to claim 6, wherein said generating means generates correction data for a printing element having a large print density difference, on the basis of the print density difference of the printing elements calculated by said calculating means.

8. A printhead corrected by the printhead correction apparatus according to claim 1.

9. The printhead according to claim 8, wherein the printhead includes an EEPROM as said memory means.

10. The printhead according to claim 8, wherein said printhead includes N×M number of printing elements and is configured by arraying, in a line, M number of circuit boards each having N number of printing elements.

11. The printhead according to claim 8, wherein said printhead is an ink-jet printhead for performing printing by discharging an ink.

12. The printhead according to claim 11, wherein said printhead is a printhead for discharging the ink by utilizing heat energy, and includes heat energy transducers for generating the heat energy to be applied to the ink.

13. A printer utilizing the printhead according to claim 8, comprising:

receiving means for receiving the correction data from said printhead;

controlling means for generating a control signal to control operation of driving means such that each of the plurality of printing elements forms a uniform pixel; and transmitting means for transmitting the control signal to said printhead.

14. The printer according to claim 13, wherein said printhead is an ink-jet printhead for performing printing by discharging an ink.

15. The printer according to claim 14, wherein said printhead is a printhead for discharging the ink by utilizing heat energy, and includes heat energy transducers for generating the heat energy to be applied to the ink.

16. A method of correcting a printing density characteristic of a printhead having a plurality of printing elements and a memory medium capable of storing data, and providing the corrected printhead for a printing apparatus for use of actual printing, comprising:

a storing step of storing a plurality of correction tables each corresponding to a tendency of density variance, in a printed image, caused by a structure of the printhead;

a selecting step of selecting the most appropriate correction table from the plurality of correction tables, in accordance with a tendency of density variance in an image test-printed by the printhead subjected to correction; and an outputting step of outputting correction data based on the correction table selected in said selecting step, to the memory medium of the printhead subjected to correction.

17. The method according to claim 16, further comprising:

a print control step of test-printing a print pattern on a recording medium by using the printhead subjected to correction; and an analyzing step of analyzing a tendency of density variance in an image of the print pattern printed on the recording medium, wherein in said selecting step, the most appropriate correction table is selected on the basis of the analysis result in said analyzing step.

18. The method according to claim 17, further comprising a generating step of, by performing calculation on the basis of the correction table selected in said selecting step, generating correction data used for suppressing density unevenness caused by printing an image by the printhead subjected to correction.

* * * * *

UNITED STATES PATENT AND TRADEMARK OFFICE
CERTIFICATE OF CORRECTION

PATENT NO.   : 6,094,280
DATED        : July 25, 2000
INVENTOR(S)  : Hayasaki et al.

It is certified that error appears in the above-identified patent and that said Letters Patent is hereby corrected as shown below:

[56] References Cited:
FOREIGN PATENT DOCUMENTS, the following should be inserted:

| | | |
|---|---|---|
| --2-2009  | 01/1990 | Japan |
| 4-229278  | 08/1992 | Japan |
| 4-232749  | 08/1992 | Japan |
| 5-24192   | 02/1993 | Japan--. |

Column 1:
Line 57, "Nos. 55-10  132253," should read --Nos. 55-132253,--.

Column 2:
Line 8, "manufactured" should read --manufacture--.

Column 6:
Line 56, "go" should be deleted.

Column 7:
Line 35, "at" should read --at a--.

Column 10:
Line 10, "at-step" should read --at step--.

UNITED STATES PATENT AND TRADEMARK OFFICE
CERTIFICATE OF CORRECTION

PATENT NO.  : 6,094,280
DATED       : July 25, 2000
INVENTOR(S) : Hayasaki et al.

It is certified that error appears in the above-identified patent and that said Letters Patent is hereby corrected as shown below:

<u>Column 15</u>:
Line 21, "recording . medium" should read --recording medium--.

Signed and Sealed this

Nineteenth Day of June, 2001

*Attest:*

*Nicholas P. Godici*

*Attesting Officer*

NICHOLAS P. GODICI
*Acting Director of the United States Patent and Trademark Office*